(12) United States Patent
Yoshioka et al.

(10) Patent No.: US 12,438,756 B2
(45) Date of Patent: Oct. 7, 2025

(54) SIGNAL GENERATION APPARATUS AND SIGNAL GENERATION METHOD

(71) Applicant: ANRITSU CORPORATION, Kanagawa (JP)

(72) Inventors: Hironori Yoshioka, Kanagawa (JP); Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 18/753,426

(22) Filed: Jun. 25, 2024

(65) Prior Publication Data

US 2025/0106074 A1   Mar. 27, 2025

(30) Foreign Application Priority Data

Sep. 25, 2023   (JP) .................. 2023-160154

(51) Int. Cl.
| | |
|---|---|
| H04L 25/49 | (2006.01) |
| H04B 1/40 | (2015.01) |
| H04L 27/22 | (2006.01) |
| H03M 1/12 | (2006.01) |

(52) U.S. Cl.
CPC ........... *H04L 25/4917* (2013.01); *H04B 1/40* (2013.01); *H04L 27/22* (2013.01); *H03M 1/1245* (2013.01)

(58) Field of Classification Search
CPC ....... H04L 25/4917; H04L 27/22; H04B 1/40; H03M 1/1245
USPC ................... 375/219, 293, 354–356
See application file for complete search history.

(56) References Cited

U.S. PATENT DOCUMENTS

| | | | |
|---|---|---|---|
| 9,312,910 B1* | 4/2016 | Chen ..................... | H04L 7/0025 |
| 2011/0037505 A1* | 2/2011 | Kawamoto ............... | H03L 7/07 |
| | | | 327/159 |
| 2024/0039688 A1* | 2/2024 | Yoshioka ................. | H04B 1/04 |

FOREIGN PATENT DOCUMENTS

JP   6346212 B2   6/2018

\* cited by examiner

*Primary Examiner* — Emmanuel Bayard
(74) *Attorney, Agent, or Firm* — McDonald Hopkins LLC

(57) ABSTRACT

The signal generation apparatus includes a phase difference calculation processing unit that calculates an initial phase difference between a division clock or an external clock selected by a clock selection unit and an initial value of the phase of the toggle pattern based on a relationship between the voltage value acquired by the phase acquisition processing unit and a change amount from the initial value of the phase of the toggle pattern, and a phase shift processing unit that moves the phase of the toggle pattern from the initial value by the initial phase difference such that a phase difference between the division clock or the external clock selected by the clock selection unit and the toggle pattern is within a predetermined range.

6 Claims, 15 Drawing Sheets

SIGNAL GENERATION APPARATUS AND SIGNAL GENERATION METHOD

TECHNICAL FIELD

The present invention relates to a signal generation apparatus and a signal generation method, and more particularly, relates to a signal generation apparatus and a signal generation method including a transceiver that converts parallel data into high-speed serial data, and outputs the serial data.

BACKGROUND ART

With the acceleration of communication standards such as Ethernet (registered trademark) 800 gigabit Ethernet (GbE) and peripheral component interconnect express (PCIe) (registered trademark) generation (Gen) 6, a signal transmission method is also changed from a simple binary digital signal such as non return to zero (NRZ) to a method represented by pulse amplitude modulation (PAM) 4. In the future, transmission methods such as PAM8 and PAM16 may be standardized. In a case where a product using these signals is developed or tested, a test signal source is required.

It is natural that such a signal source can generate a signal such as PAM4 or PAM8, and it is desirable that the signal source can generate a signal passing through a specific transmission path or a signal on which emphasis or filter processing is performed. Therefore, there is a demand for an arbitrary waveform generator (AWG) capable of generating various waveforms in an analog manner, and having a high speed exceeding 100 G symbol/s (Gsps).

In the AWG, it is necessary that a user can freely set an analog waveform to be output. In addition, it is natural that various signals are required to be generated, and thus it is necessary to be able to set the waveform with numerical data. Therefore, the AWG requires a mechanism for converting digital data output from a field programmable gate array (FPGA), an application specific integrated circuit (ASIC), or the like into analog data inside the AWG. The conversion itself can be performed by a digital analog converter (DAC).

Meanwhile, in a case where an output rate of the required analog data is high, not only is it necessary to input a signal speeded up by multiplexing by a multiplexer (MUX) to a DAC, but also an influence of a phase difference between a plurality of input signals input to the DAC or the MUX at a front stage of the DAC cannot be ignored. For example, in a case where the output rate of the FPGA is 32 Gsps and a bit resolution of the DAC is 8 bits, it is desired that the maximum phase difference between all signals input to the MUX is less than 0.1 unit interval (UI) (3.125 ps).

Here, by using the technique disclosed in Patent Document 1, it is possible to adjust a maximum phase difference between all signals input to a MUX to a value of less than 0.1 UI or a value close to 0.1 UI.

RELATED ART DOCUMENT

[Patent Document]
[Patent Document 1] Japanese Patent No. 6346212

DISCLOSURE OF THE INVENTION

Problem that the Invention is to Solve

Meanwhile, the technique disclosed in Patent Document 1 may adjust a phase between the signals input to the MUX at a position shifted by one clock (1 UI). This occurs in a case where the phases between the signals before the adjustment largely deviate from each other.

Specifically, in the technique disclosed in Patent Document 1, in a case where the phase difference of more than 1 UI occurs between the signals before the adjustment, the technique cannot correspond to the case. Further, even in a case where the phase difference between the signals before the adjustment is reduced to be within 1 UI in advance by another method, technical and cost issues occur such as the need for an additional mechanism for adjusting a clock phase applied to a transceiver of the FPGA and the need for measuring the phase adjustment amount that is changed with a frequency. In a case of the FPGA, there is a possibility that the phase difference between the transceivers changes each time activation or reset is performed, and in this case, the phase adjustment amount needs to be re-measured each time the activation or the reset is performed. In addition, depending on the FPGA to be used, there is also a possibility that the phase difference of the output signals cannot be reduced to within 1 UI at first.

In this case, unintended data is generated in a case where the signal is multiplexed by using the MUX. For example, in a case where the data is used as a test signal of a bit error rate tester (BERT), since there is an error in the test signal itself, it is impossible to measure a correct error rate.

The present invention is made to solve such problems in the related art, and an object of the present invention is to provide a signal generation apparatus and a signal generation method capable of significantly increasing an adjustable maximum phase difference between signals respectively output from a plurality of transceivers.

Means for Solving the Problem

According to the present invention, there is provided a signal generation apparatus (1) including: a parallel data output unit (11) that outputs parallel data of a plurality of bits; a plurality of transceivers (20) that have a first-in first-out (FIFO) (21) for storing parallel data of N bits among the parallel data of the plurality of bits output from the parallel data output unit, and convert the parallel data of N bits stored in the FIFO into serial data of 1 bit; a phase synchronization control unit (31) that controls a phase of the serial data of 1 bit converted by each of the transceivers; a division clock output unit (14) that outputs a division clock obtained by dividing a frequency of an external clock; a division ratio setting unit (33) that sets a division ratio of the division clock in the division clock output unit; a clock selection unit (17) that selects any one of the external clock and the division clock; a rate control unit (34) that performs control of outputting a toggle pattern having a frequency half a frequency of the division clock or the external clock selected by the clock selection unit as the serial data of 1 bit from each of the transceivers; and a phase demodulation unit (40) that measures a voltage value corresponding to a phase difference between the division clock or the external clock selected by the clock selection unit and the toggle pattern, in which the phase synchronization control unit includes a phase acquisition processing unit (31b) that executes a phase acquisition process of acquiring the voltage value measured by the phase demodulation unit while changing a phase of the toggle pattern from an initial value, a phase difference calculation processing unit (31c) that executes a phase difference calculation process of calculating an initial phase difference between the division clock or the external clock selected by the clock selection unit and the initial value of the phase of the toggle pattern, based on a relationship between the voltage value acquired by the phase acquisition processing unit and a change amount from the initial value of the phase of the toggle pattern, and a phase shift processing unit (31d) that executes a phase shift process of moving the phase of the toggle pattern from the initial value by the initial phase difference such that a phase difference between the division clock or the external clock selected by the clock selection unit and the toggle pattern is within a predetermined range, the phase synchronization control unit repeatedly executes the phase acquisition process, the phase difference calculation process, and the phase shift process while causing the division ratio setting unit to gradually decrease the division ratio, and the clock selection unit selects the external clock instead of the division clock after the phase acquisition process, the phase difference calculation process, and the phase shift process are executed when the division ratio is a predetermined minimum value.

With this configuration, the signal generation apparatus according to the present invention can reduce the maximum phase difference between the pieces of serial data respectively output from the plurality of transceivers to 0.1 UI or less with the external clock base.

In addition, the signal generation apparatus according to the present invention can significantly increase the adjustable maximum phase difference between the pieces of serial data respectively output from the plurality of transceivers after the activation or the reset.

Further, the signal generation apparatus according to the present invention does not require an additional mechanism such as a delay circuit outside the FPGA for reducing the phase difference between the serial data before the adjustment to within 1 UI in advance, and thus it is not necessary to investigate a parameter to be given to the additional mechanism after a product is manufactured.

Further, the signal generation apparatus according to the present t invention may be configured such that the division ratio is an integer of a power of 2, and the clock selection unit selects the external clock instead of the division clock after the phase acquisition process, the phase difference calculation process, and the phase shift process are executed when the division ratio is 2.

Further, the signal generation apparatus according to the present invention may be configured such that each of the transceivers includes a parallel-in serial-out (PISO) (22) that converts the parallel data of N bits read from the FIFO into the serial data of 1 bit in accordance with a read clock signal, a use amount determination unit (23) that executes first and second use amount determination processes of determining whether or not a use amount of the FIFO is equal to or more than a use amount threshold value, and a phase adjustment unit (24) that executes a first phase adjustment process of decreasing a phase of the read clock signal by a predetermined amount and a second phase adjustment process of increasing the phase of the read clock signal by the predetermined amount, the phase synchronization control unit further includes a use amount control processing unit (31a) that executes a use amount control process of controlling the use amount of the FIFO, the use amount control processing unit causes the use amount determination unit to execute the first use amount determination process under a condition in which an output of the serial data from each of the transceivers is started, the use amount control processing unit causes the phase adjustment unit to execute the first phase adjustment process under a condition in which the use amount of the FIFO of each of the transceivers is determined to be equal to or more than the use amount threshold value in the first use amount determination process, the use amount control processing unit causes the use amount determination unit to execute the second use amount determination process under a condition in which the number of times the use amount of the FIFO of each of the transceivers is continuously determined to be less than the use amount threshold value in the first use amount determination process reaches a first determination count, the use amount control processing unit causes the phase adjustment unit to execute the second phase adjustment process under a condition in which the use amount of the FIFO of each of the transceivers is determined to be less than the use amount threshold value in the second use amount determination process, and the use amount control processing unit causes the phase adjustment unit to end the adjustment of the phase of the read clock signal under a condition in which the number of times the use amount of the FIFO of each of the transceivers is continuously determined to be equal to or more than the use amount threshold value in the second use amount determination process reaches a second determination count.

That is, the signal generation apparatus according to the present invention executes the use amount control process of equalizing the use amounts of all the lanes of the FIFO to half before starting the phase acquisition process, the phase difference calculation process, and the phase shift process. With this configuration, in the signal generation apparatus according to the present invention, for example, in a case where the use amount of the FIFO is the largest and the division clock of the division ratio is equivalent to 2 UI, the phase of the toggle pattern can be moved to both the positive and negative maximum ranges of −1 UI to +1 UI during the phase acquisition process.

Further, according to the present invention, there is provided a signal generation method using a signal generation apparatus (1) including a parallel data output unit (11) that outputs parallel data of a plurality of bits, a plurality of transceivers (20) that have a first-in first-out (FIFO) (21) for storing parallel data of N bits among the parallel data of the plurality of bits output from the parallel data output unit, and convert the parallel data of N bits stored in the FIFO into serial data of 1 bit, a division clock output unit (14) that outputs a division clock obtained by dividing a frequency of an external clock, a clock selection unit (17) that selects any one of the external clock and the division clock, and a phase demodulation unit (40) that measures a voltage value corresponding to a phase difference between the division clock or the external clock selected by the clock selection unit and the serial data of 1 bit, to control a phase of the serial data of 1 bit converted by each of the transceivers, the signal generation method including: a division ratio setting step (S14, S20) of setting a division ratio of the division clock in the division clock output unit; a rate control step (S15, S22) of outputting a toggle pattern having a frequency half a frequency of the division clock or the external clock selected by the clock selection unit as the serial data of 1 bit from each of the transceivers; a phase acquisition process step (S16, S23) of executing a phase acquisition process of acquiring the voltage value measured by the phase demodulation unit while changing a phase of the toggle pattern from an initial value; a phase difference calculation process step (S17, S24) of executing a phase difference calculation process of calculating an initial phase difference between the division clock or the external clock selected by the clock selection unit and the initial value of the phase of the toggle pattern based on a relationship between the voltage value acquired by the phase acquisition process step and a change amount from the initial value of the phase of the toggle pattern; a phase shift process step (S18, S25) of executing a phase shift process of moving the phase of the toggle pattern from the initial value by the initial phase difference such that a phase difference between the division clock or the external clock selected by the clock selection unit and the toggle pattern is within predetermined range; a step (S15 to S20) of repeatedly executing the phase acquisition process, the phase difference calculation process, and the phase shift process while gradually decreasing the division ratio in the division ratio setting step; and an external clock selection step (S21) of causing the clock selection unit to select the external clock instead of the division clock after the phase acquisition process, the phase difference calculation process, and the phase shift process are executed when the division ratio is a predetermined minimum value.

Further, the signal generation method according to the present invention may be configured such that the division ratio is an integer of a power of 2, and in the external clock selection step, after the phase acquisition process, the phase difference calculation process, and the phase shift process are executed when the division ratio is 2, the external clock is selected instead of the division clock.

Further, the signal generation method according to the present invention may be configured such that each of the transceivers includes a parallel-in serial-out (PISO) (22) that converts the parallel data of N bits read from the FIFO into the serial data of 1 bit in accordance with a read clock signal, a use amount determination unit (23) that executes first and second use amount determination processes of determining whether or not a use amount of the FIFO is equal to or more than a use amount threshold value, and a phase adjustment unit (24) that executes a first phase adjustment process of decreasing a phase of the read clock signal by a predetermined amount and a second phase adjustment process of increasing the phase of the read clock signal by the predetermined amount, the phase of the read clock signal by the predetermined amount, a phase synchronization control unit includes a use amount control processing unit (31a) that executes a use amount control process of controlling the use amount of the FIFO, the use amount control processing unit causes the use amount determination unit to execute the first use amount determination process under a condition in which an output of the serial data from each of the transceivers is started, the use amount control processing unit causes the phase adjustment unit to execute the first phase adjustment process under a condition in which the use amount of the FIFO of each of the transceivers is determined to be equal to or more than the use amount threshold value in the first use amount determination process, the use amount control processing unit causes the use amount determination unit to execute the second use amount determination process under a condition in which the number of times the use amount of the FIFO of each of the transceivers is continuously determined to be less than the use amount threshold value in the first use amount determination process reaches a first determination count, the use amount control processing unit causes the phase adjustment unit to execute the second phase adjustment process under a condition in which the use amount of the FIFO of each of the transceivers is determined to be less than the use amount threshold value in the second use amount determination process, and the use amount control processing unit causes the phase adjustment unit to end the adjustment of the phase of the read clock signal under a condition in which the number of times the use amount of the FIFO of each of the transceivers is continuously determined to be equal to or more than the use amount threshold value in the second use amount determination process reaches a second determination count.

Advantage of the Invention

An object of the present invention is to provide a signal generation apparatus and a signal generation method capable of significantly increasing an adjustable maximum phase difference between signals respectively output from a plurality of transceivers.

BRIEF DESCRIPTION OF THE DRAWINGS

FIGS. 9A to 9C are diagrams for describing a phase shift process of the toggle pattern of each lane by a phase synchronization control unit provided in the FPGA control unit, in which FIG. 9A illustrates a case where an initial phase difference of the toggle pattern of all the lanes is distributed positively, FIG. 9B illustrates a case where the initial phase difference of the toggle pattern of each lane is distributed positively or negatively, and FIG. 9C illustrates a case where the initial phase difference of the toggle pattern of each lane is distributed positively or negatively and the positive distribution and the negative distribution are separated by 0.5 UI or more.

FIGS. 13A and 13B are diagrams illustrating the phase relationship of the toggle pattern of each lane in a case where the division ratio of a division clock is 64, in which FIG. 13A is a diagram illustrating a timing of the toggle pattern from a transceiver of each lane immediately after the initial phase difference is calculated by a phase difference calculation process in a simplified manner, and FIG. 13B is a diagram illustrating a timing of the toggle pattern from the transceiver of each lane immediately after the phase is moved by the phase shift process in a simplified manner.

FIGS. 14A and 14B are diagrams illustrating the phase relationship of the toggle pattern of each lane in a case where the division ratio of the division clock is 4, in which FIG. 14A is a diagram illustrating a timing of the toggle j from the transceiver of each lane immediately after the initial phase difference is calculated by the phase difference calculation process in a simplified manner, and FIG. 14B is a diagram illustrating a timing of the toggle pattern from the transceiver of each lane immediately after the phase is moved by the phase shift process in a simplified manner.

FIGS. 15A and 15B are diagrams illustrating the phase relationship of the toggle pattern of each lane in a case where the division ratio of the division clock is 2, in which FIG. 15A is a diagram illustrating a timing of the toggle pattern from the transceiver of each lane immediately after the initial phase difference is calculated by the phase difference calculation process in a simplified manner, and FIG. 15B is a diagram illustrating a timing of the toggle pattern from the transceiver of each lane immediately after the phase is moved by the phase shift process in a simplified manner.

FIGS. 16A and 16B are diagrams illustrating the phase relationship of the toggle pattern of each lane in a case where an external clock is selected by a clock selection unit, in which FIG. 16A is a diagram illustrating a timing of the toggle pattern from the transceiver of each lane immediately after the initial phase difference is calculated by the phase difference calculation process in a simplified manner, and FIG. 16B is a diagram illustrating a timing of the toggle pattern from the transceiver of each lane immediately after the phase is moved by the phase shift process in a simplified manner.

BEST MODE FOR CARRYING OUT THE INVENTION

Hereinafter, embodiments of a signal generation apparatus and a signal generation method according to the present invention will be described with reference to the drawings.

Figure 1:
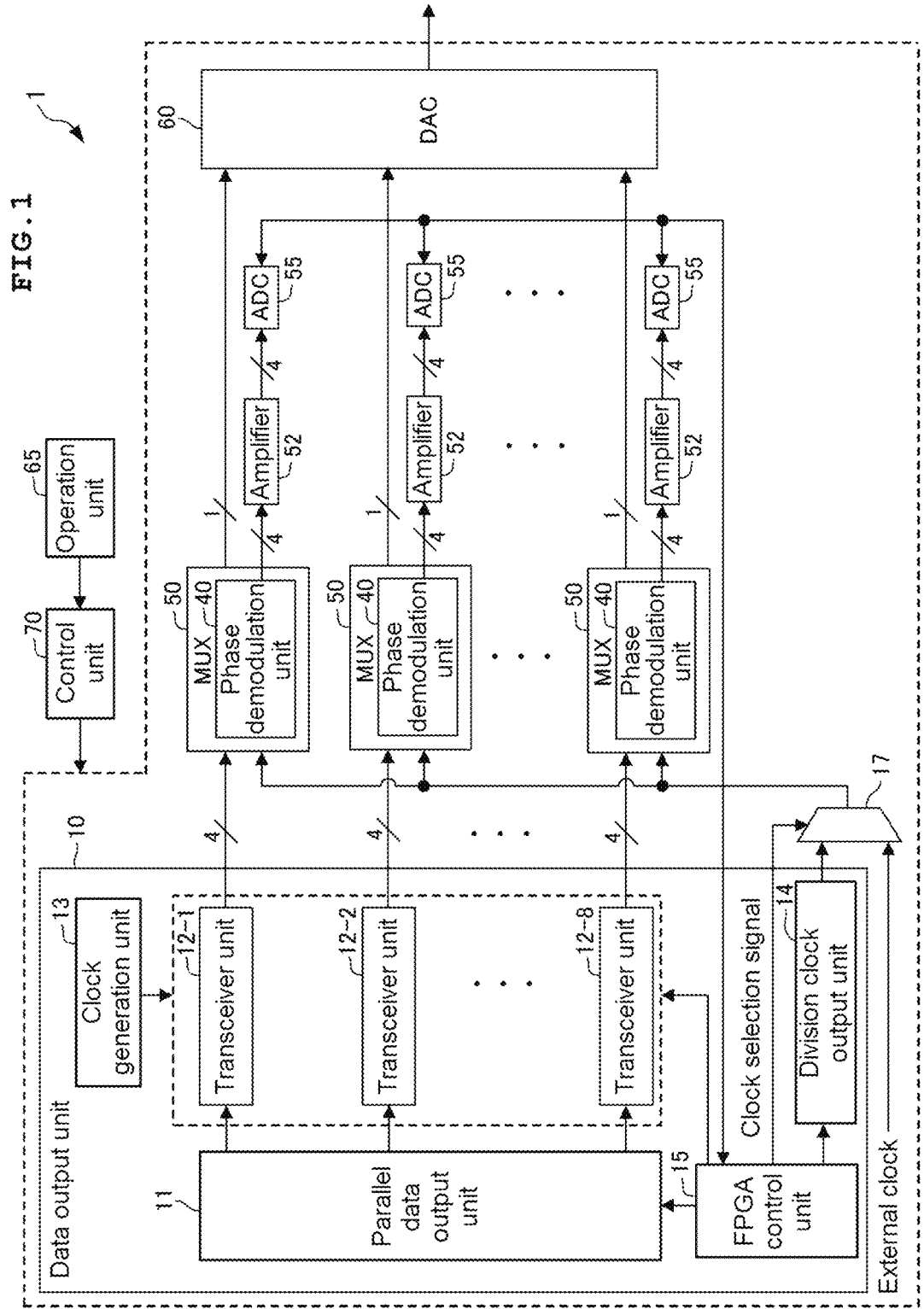
FIG. 1 is a block diagram illustrating a configuration of a signal generation apparatus according to an embodiment of the present invention.

A signal generation apparatus 1 according to the present embodiment illustrated in FIG. 1 includes a data output unit 10, a clock selection unit 17, a phase demodulation unit 40, a MUX 50, an amplifier 52, an ADC 55, a DAC 60, an operation unit 65, and a control unit 70. The data output unit 10 is configured on, for example, an FPGA or an ASIC. Hereinafter, the data output unit 10 will be described as being configured on the FPGA.

The data output unit 10 includes a parallel data output unit 11, a plurality of transceiver units 12-1 to 12-$p$, a clock generation unit 13, a division clock output unit 14, and an FPGA control unit 15.

The parallel data output unit 11 includes a memory (not illustrated) that stores a series of data strings of a predetermined pattern in advance, or an arithmetic circuit (not illustrated) that generates the data string therein. For example, in the example illustrated in FIG. 2, the parallel data output unit 11 is configured to output parallel data of 32×N bits.

The parallel data output unit 11 is configured to output a pattern of a PAM signal consisting of, for example, a multi-value K (K is an integer of 2 or more) of two values or more as the parallel data of 32×N bits, based on pattern information input from the operation unit 65. The parallel data output unit 11 generates a pattern of a PAM signal consisting of various multi-values K, such as an NRZ signal (K=2), a PAM3 signal (K=3), a PAM4 signal (K=4), a PAM5 signal (K=5), a PAM6 signal (K=6), a PAM7 signal (K=7), and a PAM8 signal (K=8), for example. Here, the pattern information is information on a pattern of the PAM signal, such as a value of K or a type of the pattern (for example, a pseudo random binary sequence (PRBS) pattern, a short stress pattern random quaternary (SSPRQ) pattern, or various patterns).

The data output unit 10 includes the p transceiver units 12-1 to 12-$p$. Although the example of p=8 is illustrated in FIGS. 1 and 2, in the present invention, the number of transceiver units 12 is not limited to 8, and may have various numbers.

Figure 2:
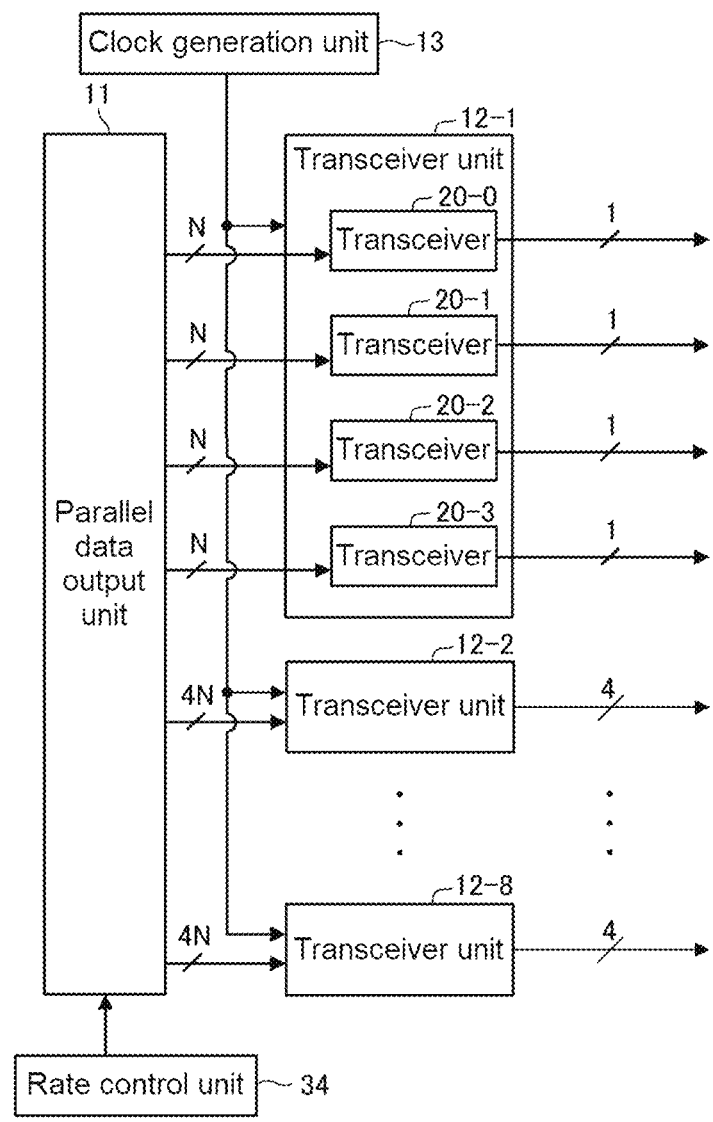
FIG. 2 is a block diagram illustrating a part of a configuration of a data output unit provided in the signal generation apparatus of FIG. 1.

As illustrated in FIG. 2, a clock signal generated by the clock generation unit 13 is allocated to each of the transceiver units 12.

Each transceiver unit 12 includes, for example, four transceivers 20-0 to 20-3. Each transceiver 20 is an output unit of the FPGA, and outputs a digital signal of 0 or 1. Each transceiver 20 converts parallel data of N bits stored in an FIFO 21, which will be described below, of parallel data of 32×N bits output from the parallel data output unit 11 into serial data of 1 bit, at a timing of the clock signal generated by the clock generation unit 13. Here, N is an integer of 2 or more.

That is, each transceiver unit 12 converts parallel data of 4×N bits output from the parallel data output unit 11 into parallel data of 4 bits, and output the parallel data of 4 bits. That is, the data output unit 10 outputs the parallel data of 4 bits for 8 channels, in other words, serial data for 32 lanes.

The division clock output unit 14 outputs a division clock obtained by dividing a frequency of an external clock. A maximum frequency of the division clock is half of the frequency of the external clock. For example, the division clock output unit 14 consists of a transceiver having the same configuration as each transceiver 20.

The clock selection unit 17 selects any one of the external clock and the division clock, according to a clock selection signal output from a clock selection signal output unit 35, which will be described below. In the present specification, the division clock and the external clock are collectively referred to as a "clock". The external clock is, for example, a pulse signal of 32 GHZ.

The phase demodulation unit 40 measures a voltage value corresponding to a phase difference between the division clock or the external clock selected by the clock selection unit 17 and a toggle pattern output from each of the transceivers 20. The toggle pattern is serial data of 1 bit in which "0" and "1" are alternately repeated, and is output from each of the transceivers 20 in a case where a phase acquisition process, a phase difference calculation process, and a phase shift process, which will be described below, are executed. The phase demodulation unit 40 is disposed one by one at a later stage of each of the transceivers 20. Since the phase demodulation unit 40 is for checking a phase of the toggle pattern output from each of the transceivers 20, the phase demodulation unit 40 may be incorporated into the MUX 50 or may be independently disposed at a front stage of the MUX 50.

Figure 3:
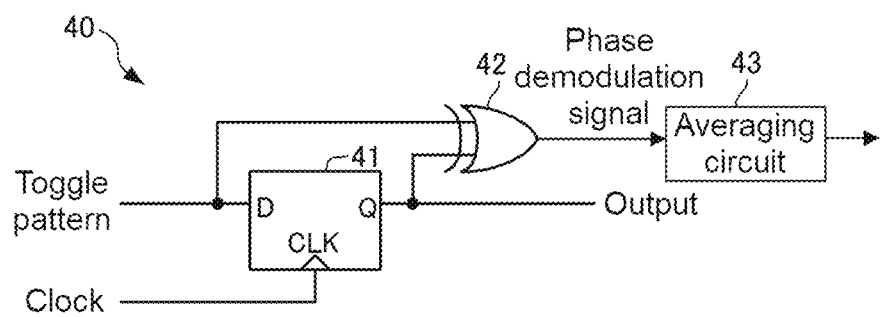
FIG. 3 is a schematic diagram of a phase demodulation unit provided in the signal generation apparatus of FIG. 1.

FIG. 3 illustrates a schematic diagram of the phase demodulation unit 40 for one lane. As illustrated in FIG. 3, the phase demodulation unit 40 includes, for example, a D flip-flop 41, an EXOR circuit 42, and an averaging circuit 43.

The D flip-flop 41 includes a D terminal and a CLK terminal which are two input terminals, and a Q terminal which is one output terminal. The toggle pattern from the corresponding transceiver 20 is input to the D terminal, and the clock selected by the clock selection unit 17 is input to the CLK terminal.

The EXOR circuit 42 outputs a phase demodulation signal by taking an exclusive OR of the toggle pattern from the corresponding transceiver 20 and an output signal from the Q terminal of the D flip-flop 41. When the toggle pattern having a period twice a period of the clock is input to the D terminal, the phase demodulation signal is a pulse-shaped signal having a duty ratio corresponding to a phase of the toggle pattern input to the D terminal.

The averaging circuit 43 is configured with, for example, a low-pass filter, and averages the phase demodulation signal. When the toggle pattern having the period twice the period of the clock is input to the D terminal, the averaging circuit 43 outputs a signal of a voltage value corresponding to the duty ratio of the phase demodulation signal. As a result, the phase of the toggle pattern from the corresponding transceiver 20 can be obtained as a voltage value.

The amplifier 52 amplifies a signal from the phase demodulation unit 40 to a voltage level suitable for the ADC 55 at a later stage, as necessary.

The ADC 55 samples the signal from the phase demodulation unit 40 amplified by the amplifier 52 at a predetermined sampling rate, and converts the signal into digital data. That is, the ADC 55 outputs the digital data of the voltage value corresponding to the phase difference between the division clock or the external clock selected by the clock selection unit 17 and the toggle pattern. Here, the predetermined sampling rate need only be a value of, for example, 500 ksps or 1 Msps, such as several hundred ksps to several Msps. Therefore, as the ADC 55, an ADC having a plurality of input channels, such as a 4-channel ADC, can also be used.

The MUX 50 latches parallel data of m bits output from each transceiver unit 12, selects the parallel data in units of n bits in a predetermined order in synchronization with the external clock selected by the clock selection unit 17, and outputs the data of n bits according to a frequency of the external clock selected by the clock selection unit 17. Here, n is an integer of 1 or more and m−1 or less. In the example illustrated in FIG. 1, n=1 and m=4. That is, the MUX 50 can multiplex the data of m bits from each transceiver unit 12 into data of n bits.

The DAC 60 is a DAC of n×p bits, and outputs an analog signal having a resolution of n×p bits, that is, a multi-value K PAM signal, in accordance with the data of n×p bits output from all the MUXs 50. In the example illustrated in FIG. 1, n=1 and p=8.

The operation unit 65 is for accepting an operation input by a user, and is configured with, for example, a touch panel including a touch sensor for detecting a contact position by a contact operation on an input surface corresponding to a display screen of a display device (not illustrated). Alternatively, the operation unit 65 may be configured to include an input device such as a keyboard or a mouse. The operation input to the operation unit 65 is detected by the control unit 70.

The control unit 70 is configured with, for example, a control device, such as a computer including a central processing unit (CPU), a graphics processing unit (GPU), an FPGA, a read only memory (ROM), a random access memory (RAM), a hard disk drive (HDD), and the like, and controls the operations of the respective units described above constituting the signal generation apparatus 1.

Figure 4:
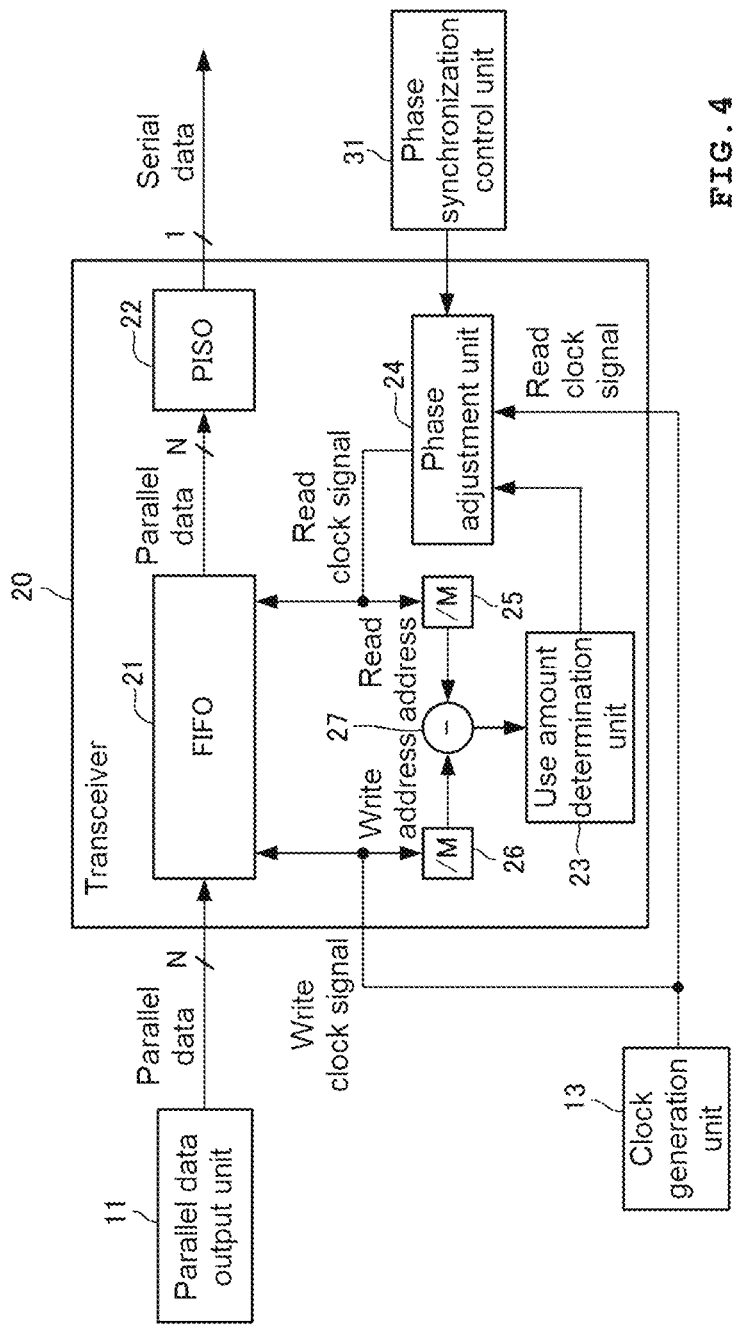
FIG. 4 is a block diagram illustrating a configuration of one lane of a transceiver unit.

FIG. 4 is a diagram illustrating a configuration of one lane of the data output unit 10. Each transceiver 20 includes a first-in first-out (FIFO) 21 that stores parallel data of N bits in parallel data of 32×N bits output from the parallel data output unit 11, a parallel-in serial-out (PISO) 22 that converts the parallel data of N bits read from the FIFO 21 into serial data of 1 bit in response to a read clock signal, a use amount determination unit 23 that executes first and second use amount determination processes of determining whether or not a use amount of the FIFO 21 is equal to or more than a use amount threshold value, a phase adjustment unit 24 that adjusts a phase of the read clock signal of the FIFO 21 to decrease or increase the phase, dividers 25 and 26, and a subtractor 27.

That is, the transceiver 20 reads the stored parallel data of N bits from the FIFO 21, performs parallel/serial conversion on the read parallel data by the PISO 22, and outputs the serial data.

In the signal generation apparatus 1 according to the present embodiment, each of the transceiver units 12 can be configured with a transceiver in which a function of adjusting a phase of a read clock signal is mounted, for example, a TX phase interpolator PPM controller (hereinafter, referred to as a "TXPI") provided by Xilinx, Inc. In addition, for example, as the FPGA on which the data output unit 10 is configured, UltraScale+ including a GTY transceiver manufactured by Xilinx, Inc. or the like can be appropriately used.

In general, regarding a plurality of transceivers configured on the FPGA, timings until data is actually output after activation or reset of the plurality of transceivers do not always coincide with each other. Therefore, at the timing at which the output of the data is started, the use amounts of the FIFOS 21 of the transceivers 20 are usually different from each other. In addition, even in a case where one transceiver 20 is focused on, the use amount may be different each time the data output is started for each activation or each reset.

Hereinafter, a basic operation of the TXPI will be described with reference to FIG. 4.

The FIFO 21 functions as a buffer for the parallel data output from the parallel data output unit 11, and can store the parallel data of N bits up to the maximum M words. The FIFO 21 writes or reads the parallel data of N bits at a rising timing of an input write clock signal or a read clock signal. The write clock signal and the read clock signal are signals based on, for example, a clock signal generated by the clock generation unit 13.

The divider 25 divides the read clock signal by the maximum word count M of the FIFO 21 to obtain a read address of the FIFO 21. On the other hand, the divider 26 divides the write clock signal by the maximum word count M of the FIFO 21 to obtain a write address of the FIFO 21.

The subtractor 27 outputs a difference between the read address and the write address output from the respective dividers 25 and 26. The difference output from the subtractor 27 reflects the use amount of the FIFO 21.

The use amount determination unit 23 executes the first and second use amount determination processes of determining whether or not the difference output from the subtractor 27 is equal to or more than a use amount threshold value for each operation clock of the FPGA on which the data output unit 10 is configured. The use amount determination unit 23 constantly monitors a difference between the read address and the write address of the FIFO 21 as the use amount of the FIFO 21, and outputs 0 in a case where the use amount is less than the use amount threshold value and outputs 1 in a case where the use amount is equal to or more than the use amount threshold value. For example, the use amount threshold value is M/2, that is, ½ of the maximum word count M of the FIFO 21. The use amount of the FIFO 21 is changed by changing a phase of the read clock signal.

The phase adjustment unit 24 executes the first phase adjustment process of decreasing the phase of the read clock signal by a predetermined amount and the second phase adjustment process of increasing the phase of the read clock signal by a predetermined amount in a use amount control process which will be described below. The first phase adjustment process is a process of decreasing the use amount of the FIFO 21, and the second phase adjustment process is a process of increasing the use amount of the FIFO 21.

The phase adjustment unit 24 can shift the read address value of the FIFO 21 by adjusting the phase of the read clock signal of the FIFO 21. As a result, the phase of the parallel data output from the FIFO 21 deviates. Meanwhile, the phase adjustment unit 24 cannot adjust the phase of the parallel data output from the FIFO 21 to various values, and a phase adjustment width that can be adjusted at once or a maximum amount that can be adjusted is also limited. For example, when an output data rate of the transceiver 20 is 32 Gbps, the adjustable phase adjustment width of the phase adjustment unit 24 is a 1/64 UI step width, and the adjustable maximum amount of the phase adjustment unit 24 is 64 UI.

Hereinafter, the use amount control process executed by a use amount control processing unit 31*a* of a phase synchronization control unit 31 (see FIG. 6) provided in the FPGA control unit 15 will be described with reference to the state transition diagram of FIG. 5. The use amount control process of the use amount control processing unit 31*a* is a process of controlling the use amount of the FIFO 21 of each transceiver 20, and is executed independently for each lane, that is, for each transceiver 20.

Figure 5:
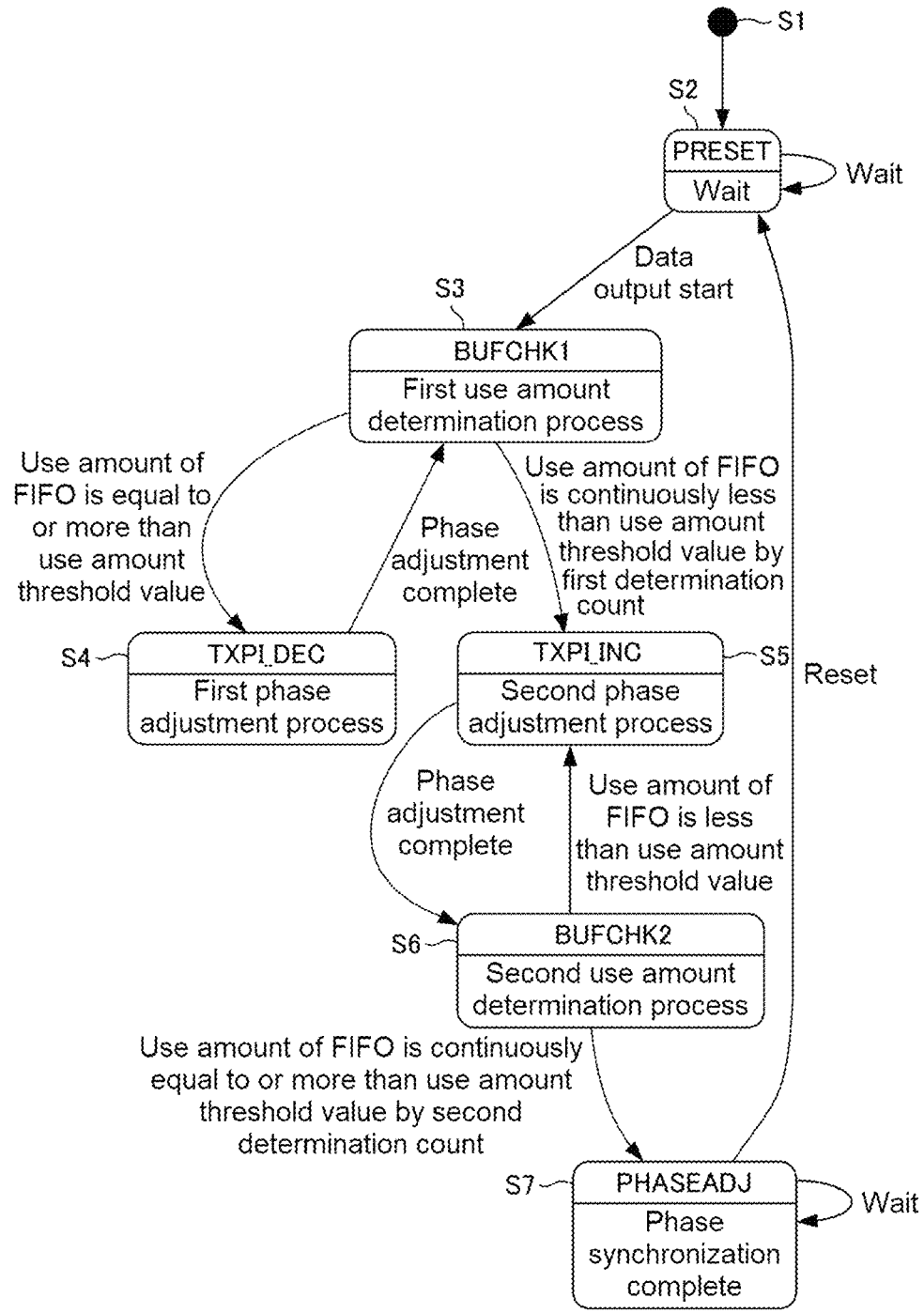
FIG. 5 is a state transition diagram for describing a phase synchronization process by the signal generation apparatus of FIG. 1.

As illustrated in FIG. 5, the use amount control processing unit 31*a* includes eight states of S1 to S7, that is, an initial state, a PRESET state, a BUFCHK1 state, a TXPI_DEC state, a TXPI_INC state, a BUFCHK2 state, and a PHASEADJ state. An arrow between the states represents a transition and a direction of the transition.

First, the use amount control processing unit 31*a* transitions from the initial state S1 to the PRESET state S2. The PRESET state S2 is a state in which each of the transceivers 20 waits until an output of serial data is started. Here, each of the transceivers 20 starts generation of a clock by a clock generation circuit (not illustrated) when a state in which the output of the serial data can be started after activation or after reset is reached. The use amount control processing unit 31*a* can detect a timing at which each of the transceivers 20 starts the output of the serial data by detecting rising of this clock.

When detecting that each of the transceivers 20 starts the output of the serial data, the use amount control processing unit 31*a* transitions from the PRESET state S2 to the BUFCHK1 state S3. The BUFCHK1 state S3 is a state in which the use amount control processing unit 31*a* causes the use amount determination unit 23 to execute the first use amount determination process.

The use amount control processing unit 31*a* transitions from the BUFCHK1 state S3 to the TXPI_DEC state S4, under a condition in which it is determined that the use amount of the FIFO 21 of each of the transceivers 20 is equal to or larger than a use amount threshold value in the first use amount determination process. The TXPI_DEC state S4 is a state in which the use amount control processing unit 31*a* executes the first phase adjustment process on the phase adjustment unit 24.

The use amount control processing unit 31*a* transitions from the TXPI_DEC state S4 to the BUFCHK1 state S3 again, under a condition in which a phase of a read clock signal of the FIFO 21 of each transceiver 20 is reduced by a predetermined amount by the first phase adjustment process.

The use amount control processing unit 31*a* transitions from the BUFCHK1 state S3 to the TXPI_INC state S5, under a condition in which the number of times the use amount of the FIFO 21 of each transceiver 20 is continuously determined to be less than the use amount threshold value in the first use amount determination process reaches a first determination count. The TXPI_INC state S5 is a state in which the use amount control processing unit 31*a* executes the second phase adjustment process on the phase adjustment unit 24.

The use amount control processing unit 31*a* transitions from the TXPI_INC state S5 to the BUFCHK2 state S6, under a condition in which the phase of the read clock signal of the FIFO 21 of each transceiver 20 is increased by a predetermined amount by the second phase adjustment process. The BUFCHK2 state S6 is a state in which the use amount control processing unit 31*a* causes the use amount determination unit 23 to execute the second use amount determination process.

The use amount control processing unit 31*a* transitions from the BUFCHK2 state S6 to the TXPI_INC state S5 again, under a condition in which it is determined that the use amount of the FIFO 21 of each transceiver 20 is less than the use amount threshold value in the second use amount determination process.

The use amount control processing unit 31*a* transitions from the BUFCHK2 state S6 to the PHASEADJ state S7, under a condition in which the number of times the use amount of the FIFO 21 of each transceiver 20 is continuously determined to be equal to or more than the use amount threshold value in the second use amount determination process reaches a second determination count. The PHASEADJ state S7 is a state in which the use amount control processing unit 31*a* waits until the phase adjustment unit 24 ends the adjustment of the phase of the read clock signal and a reset signal is input to each of the transceivers 20.

The use amount control processing unit 31*a* can align data latency of all lanes by performing the processes illustrated in FIG. 5 for all the transceivers 20 to equalizing the use amount of the FIFO 21 of all the lanes to half. Since a phase of parallel data of 32×N bits output from the parallel data output unit 11 is the same phase between all the lanes, the phases of the serial data output from all the transceivers 20 are also substantially the same phases.

According to the processing illustrated in FIG. 5, in a case where a phase adjustment width by the phase adjustment unit 24 is 1/64 UI, the phase of the serial data output from the transceiver 20 can be adjusted with an accuracy (theoretical limit value) of ±0.008 UI in calculation. The first and second determination counts may be both equal to each other or different from each other.

In the process of the use amount control processing unit 31*a* illustrated in FIG. 5, in a case where the transition from the BUFCHK1 state S3 to the TXPI_DEC state S4, the transition from the BUFCHK2 state S6 to the TXPI_INC state S5, the transition from the BUFCHK1 state S3 to the TXPI_INC state S5, and the transition from the BUFCHK2 state S6 to the PHASEADJ state S7 are executed if each determination condition is satisfied once, the maximum phase difference between the serial data output from all the transceivers 20 after the completion of the phase adjustment is a value larger than the theoretical limit value described above. This is because the use amount of the FIFO 21 is always fluctuating due to a jitter component of the write clock signal and the read clock signal, and thus the determination results of the first and second use amount determination processes by the use amount determination unit 23 also fluctuate.

Therefore, in the process of the use amount control processing unit 31a illustrated in FIG. 5, in the signal generation apparatus 1 according to the present embodiment, for the transition from the BUFCHK1 state S3 to the TXPI_INC state S5 and the transition from the BUFCHK2 state S6 to the PHASEADJ state S7, the first and second determination counts with which the transition condition is continuously satisfied are defined, and the transition is executed only in a case where the transition condition is continuously satisfied for the number of times.

Figure 6:
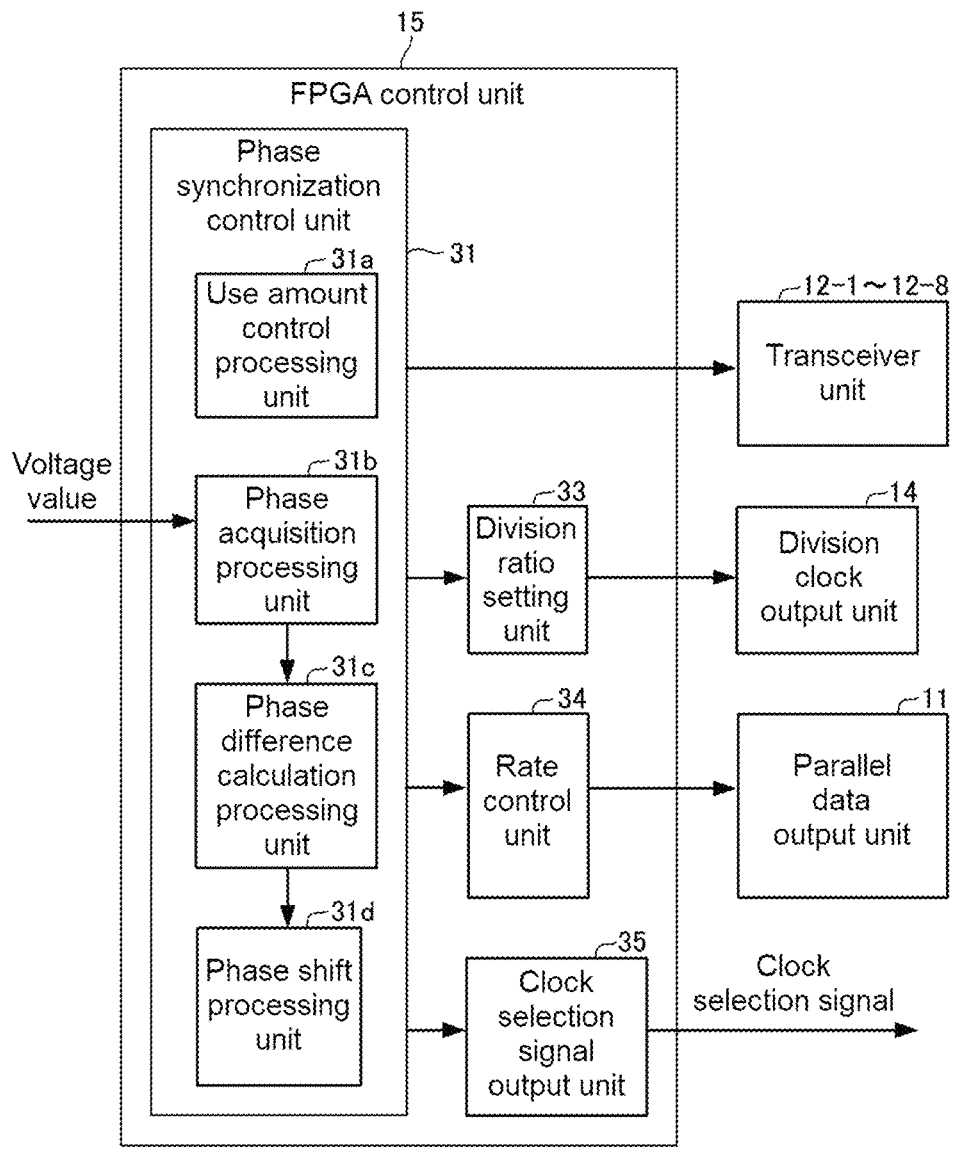
FIG. 6 is a block diagram illustrating a configuration of an FPGA control unit provided in the data output unit.

As illustrated in FIG. 6, the FPGA control unit 15 includes the phase synchronization control unit 31, a division ratio setting unit 33, a rate control unit 34, and the clock selection signal output unit 35.

The phase synchronization control unit 31 controls a phase of a toggle pattern, which is serial data of 1 bit converted by each transceiver 20.

The phase synchronization control unit 31 includes the use amount control processing unit 31a, a phase acquisition processing unit 31b, a phase difference calculation processing unit 31c, and a phase shift processing unit 31d, which are already described.

The phase acquisition processing unit 31b executes a phase acquisition process of acquiring a voltage value measured by the phase demodulation unit 40 while changing the phase of the toggle pattern output from each of the transceivers 20 by controlling the phase adjustment unit 24 of each of the transceivers 20 from an initial value. Here, digital data of the voltage value measured by the phase demodulation unit 40 is input from the ADC 55 to the phase acquisition processing unit 31b.

Figure 7:
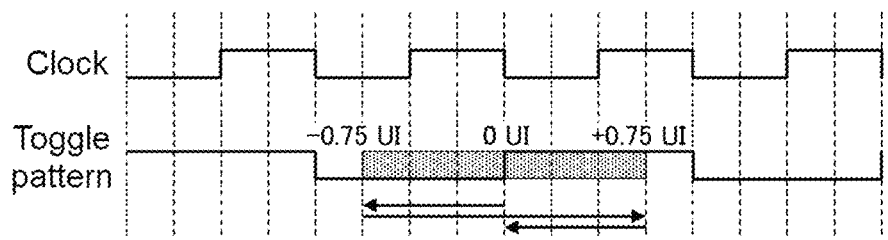
FIG. 7 is a diagram illustrating a relationship between a toggle pattern output from one lane of the data output unit and a clock.

Hereinafter, a specific example of the phase acquisition process by the phase acquisition processing unit 31b will be described. FIG. 7 illustrates a relationship between a toggle pattern output from the transceiver 20 of one lane of the data output unit 10 and a clock.

First, the phase acquisition processing unit 31b acquires a voltage value measured by the phase demodulation unit 40 at a start time point of the phase acquisition process. Here, a phase of the toggle pattern at the start time point is 0 UI. Further, the phase synchronization control unit 31 acquires the voltage value measured by the phase demodulation unit 40 while moving the phase of the toggle pattern in a range of −0.75 UI to +0.75 UI, by using 1 UI as one period of the clock at that time point. For example, as indicated by the arrow in FIG. 7, the phase synchronization control unit 31 moves the phase of the toggle pattern from 0 UI, which is the initial value, to −0.75 UI, then moves the phase from −0.75 UI to +0.75 UI, and finally moves the phase from +0.75 UI to 0 UI at the start time point.

Figure 8:
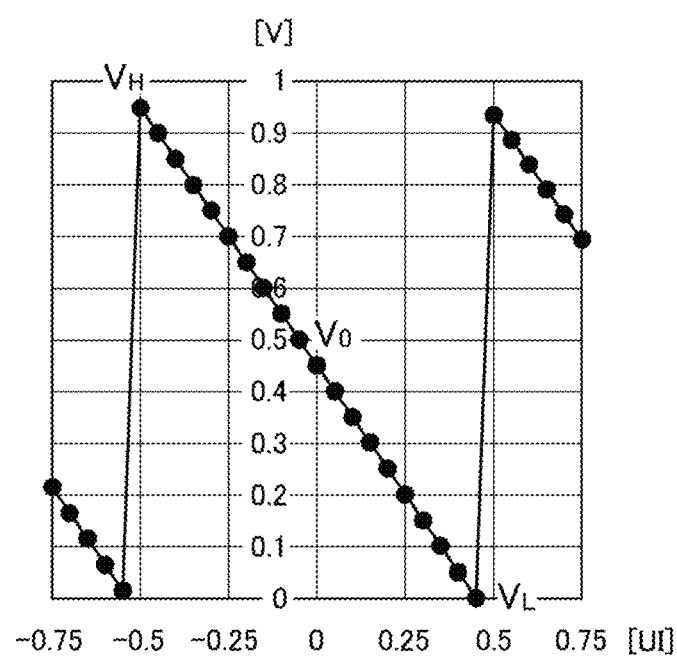
FIG. 8 is a graph illustrating a relationship between a voltage value corresponding to a duty ratio of a phase detection signal measured by a phase demodulation unit and a change amount from an initial value of a phase of the toggle pattern.

This means that, for example, the operation of performing the measurement by the phase demodulation unit 40 is repeated each time the phase of the toggle pattern is moved by approximately 0.1 UI. As a result, a result as illustrated in FIG. 8 can be obtained. In the graph of FIG. 8, a horizontal axis indicates a change amount [UI] from the initial value of the phase of the toggle pattern, and a vertical axis indicates a voltage value [V] measured by the phase demodulation unit 40.

Since the TXPI adjusts the phase of the serial data from each transceiver 20 with the use amount of the FIFO 21, there is a possibility that an adjustment width of ±0.75 UI cannot be secured if the use amount in the initial state is biased. Therefore, the phase synchronization control unit 31 performs the use amount control process, which is already described, to move the phase of the toggle pattern in the range of ±0.75 UI.

In the above description, the range of the phase change of the toggle pattern is set to −0.75 UI to +0.75 UI, and the present invention is not limited to this. The range of the phase change of the toggle pattern need only be at least 1 UI, and for example, the phase of the toggle pattern may be changed in a range of −0.5 UI to +0.5 UI.

The phase difference calculation processing unit 31c executes the phase difference calculation process of calculating an initial phase difference $P_C$ between a division clock or an external clock selected by the clock selection unit 17 and the initial value of the phase of the toggle pattern based on a relationship between the voltage value acquired by the phase acquisition processing unit 31b and a change amount from the initial value of the phase of the toggle pattern.

The phase difference calculation processing unit 31c can obtain the initial phase difference $P_C[UI]$ of the toggle pattern at the start t time point of the phase acquisition process by using the measurement result as illustrated in FIG. 8 and the following Equation (1). In Equation (1), $V_0$ is a voltage value acquired by the phase acquisition processing unit 31b at the start time point of the phase acquisition process, $V_H$ is a maximum value of the voltage value acquired by the phase acquisition processing unit 31b, and $V_L$ is a minimum value of the voltage value acquired by the phase acquisition processing unit 31b. Each value in Equation (1) is not a value as an actual measurement value, and may be a value obtained by performing correction based on linearity of the relationship between the phase and the voltage.

[Equation 1]

$$P_C = \frac{1}{2} - \frac{V_0}{V_H + V_L} \qquad (1)$$

Figure 9A:
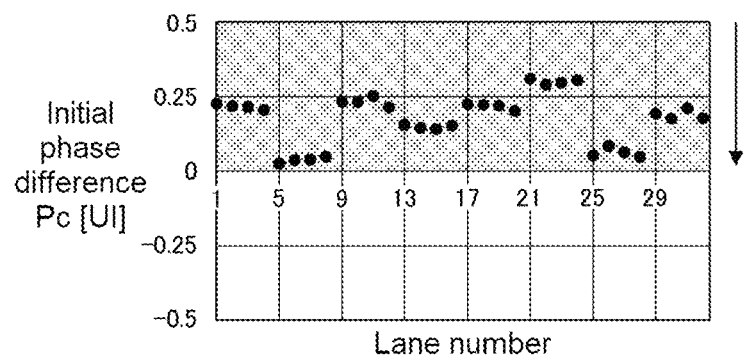
Figure 9B:
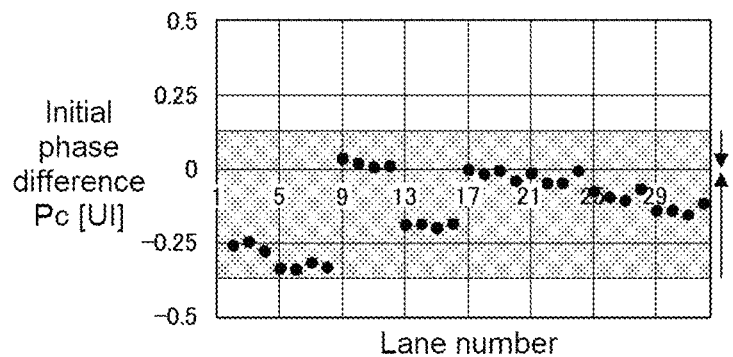
Figure 9C:
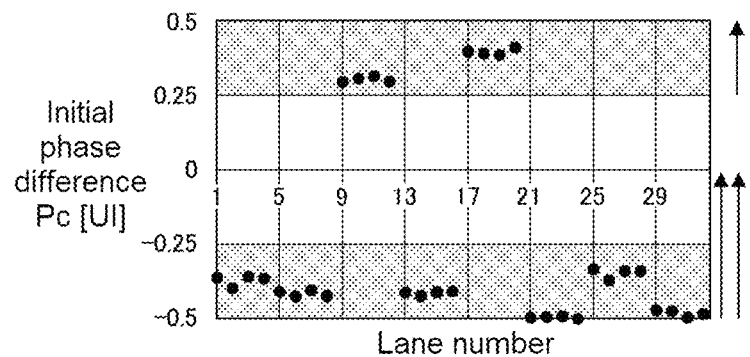

The phase synchronization control unit 31 simultaneously or sequentially performs the phase acquisition process and the phase difference calculation process in the same manner for all the toggle patterns of 32 lanes. As a result, a correspondence relationship between a lane number and the initial phase difference $P_C$ as illustrated in FIGS. 9A to 9C is obtained, for example.

Here, the lane numbers 1 to 4 correspond to the four transceivers 20-0 to 20-3 of the transceiver unit 12-1, respectively. The lane numbers 5 to 8 correspond to the four transceivers 20-0 to 20-3 of the transceiver unit 12-2, respectively. The lane numbers 9 to 12 correspond to the four transceivers 20-0 to 20-3 of the transceiver unit 12-3, respectively. The lane numbers 13 to 16 correspond to the four transceivers 20-0 to 20-3 of the transceiver unit 12-4, respectively. The lane numbers 17 to 20 correspond to the four transceivers 20-0 to 20-3 of the transceiver unit 12-5, respectively. The lane numbers 21 to 24 correspond to the four transceivers 20-0 to 20-3 of the transceiver unit 12-6, respectively. The lane numbers 25 to 28 correspond to the four transceivers 20-0 to 20-3 of the transceiver unit 12-7, respectively. The lane numbers 29 to 32 correspond to the four transceivers 20-0 to 20-3 of the transceiver unit 12-8, respectively.

The phase shift processing unit 31d executes the phase shift process of moving the phase of the toggle pattern output from each of the transceivers 20 from the initial value by the initial phase difference $P_C$ by controlling the phase adjustment unit 24 of each of the transceivers 20 such that a phase difference between the division clock or the external clock selected by the clock selection unit 17 and the toggle pattern is within a predetermined range. Here, the value (phase difference) in the predetermined range is a value closest to 0 with the highest accuracy of the phase adjustment width that can be adjusted by the phase adjustment unit 24.

Hereinafter, the phase shift process of the toggle pattern of each lane by the phase shift processing unit 31*d* will be described with reference to FIGS. 9A to 9C.

FIG. 9A illustrates a case where the initial phase difference $P_C$ of the toggle pattern output from the transceiver 20 of all the lanes is distributed positively and a distribution width of the distribution is less than 0.5 UI. In this case, the phase shift processing unit 31*d* moves the phase of the toggle pattern of all the lanes by $-P_C$ toward 0. The same applies to a case where the initial phase difference $P_C$ of all the lanes is distributed negatively.

FIG. 9B illustrates a case where the initial phase difference $P_C$ of the toggle patterns output from the transceiver 20 of each lane is distributed in any of the positive and the negative, and a distribution width of the distribution is less than 0.5 UI. In this case, the phase shift processing unit 31*d* moves the positively distributed phase of the toggle pattern by $-P_C$ toward 0, and moves the negatively distributed phase of the toggle pattern by $-P_C$ toward 0.

FIG. 9C illustrates a case where the initial phase difference $P_C$ of the toggle pattern output from the transceiver 20 of each lane is distributed in any of the positive and the negative, and the positive distribution and the negative distribution are separated by 0.5 UI or more. In this case, it is considered that a part of the distribution of the initial phase difference $P_C$, which should be within a width less than 0.5 UI, deviates by 1 UI in appearance. Therefore, the phase shift processing unit 31*d* moves, for example, the positively distributed phase of the toggle pattern in the positive direction by $1+P_C$ toward 0, and moves the negatively distributed phase of the toggle pattern in the positive direction by $-P_C$ toward 0.

As illustrated in FIGS. 9A to 9C, the four transceivers 20 provided in the same transceiver unit 12 illustrate the same distribution of the initial phase difference $P_C$. In such a case, the phase acquisition process and the phase difference calculation process may be performed only on one transceiver 20 included in each transceiver unit 12, and the obtained initial phase difference $P_C$ may be regarded as a common initial phase difference of the four transceivers 20 included in each transceiver unit 12.

The division ratio setting unit 33 sets a division ratio of the division clock with the external clock as a reference in the division clock output unit 14. The phase synchronization control unit 31 repeatedly executes the phase acquisition process, the phase difference calculation process, and the phase shift process p while causing the division ratio setting unit 33 to gradually decrease the division ratio. For example, the division ratio is an integer of a power of 2, and the maximum value is 64 and the minimum value is 2. In this case, the division ratio setting unit 33 repeatedly halves the division ratio to change the division ratio in order of 64, 32, 16, 8, 4, and 2.

Figure 10:
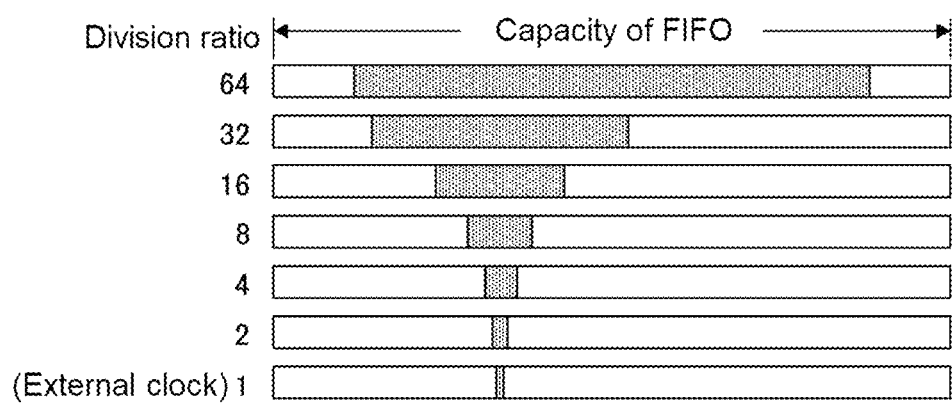
FIG. 10 is a diagram illustrating a movement amount of the phase of the toggle pattern by the phase synchronization control unit for each division ratio.

FIG. 10 is a diagram illustrating a ratio for each division ratio of a movement amount of the phase of the toggle pattern by the phase acquisition process in a case where the phase of the toggle pattern is moved in a range of −0.75 UI to +0.75 UI to a capacity of the FIFO 21, with respect to 1 UI of a division clock. For example, in a case where one clock of the external clock is defined as 1 UI, the capacity of the FIFO 21 is equivalent to 128 UI, and in a case of the division clock obtained by dividing the external clock by the maximum of 64, the capacity of the FIFO 21 is equivalent to 2 UI (±1 UI).

In a case where the division ratio is 64, 75% equivalent to the capacity of the FIFO 21 is used for moving the phase of the toggle pattern. Hereinafter, the movement amount is also halved each time the division ratio is halved, and the movement amount is equivalent to 1.17% of the capacity of the FIFO 21 in a case where the division ratio is 1.

The rate control unit 34 performs control of outputting a toggle pattern having a frequency of half a frequency of the division clock or the external clock selected by the clock selection unit 17 from each transceiver 20, as serial data of 1 bit to be output from each transceiver 20. For example, the rate control unit 34 outputs parallel data of N bits in which the frequency of the toggle pattern output from each of the transceivers 20 is half the frequency of the division clock or the external clock, from the parallel data output unit 11.

The clock selection signal output unit 35 outputs a clock selection signal for selecting any one of the external clock and the division clock to the clock selection unit 17. Specifically, the clock selection signal output unit 35 executes the phase acquisition process, the phase difference calculation process, and the phase shift process when the division ratio set by the division ratio setting unit 33 is a predetermined minimum value, and then outputs the clock selection signal for selecting the external clock instead of the division clock. The minimum value of the division ratio is, for example, 2.

Figure 11:
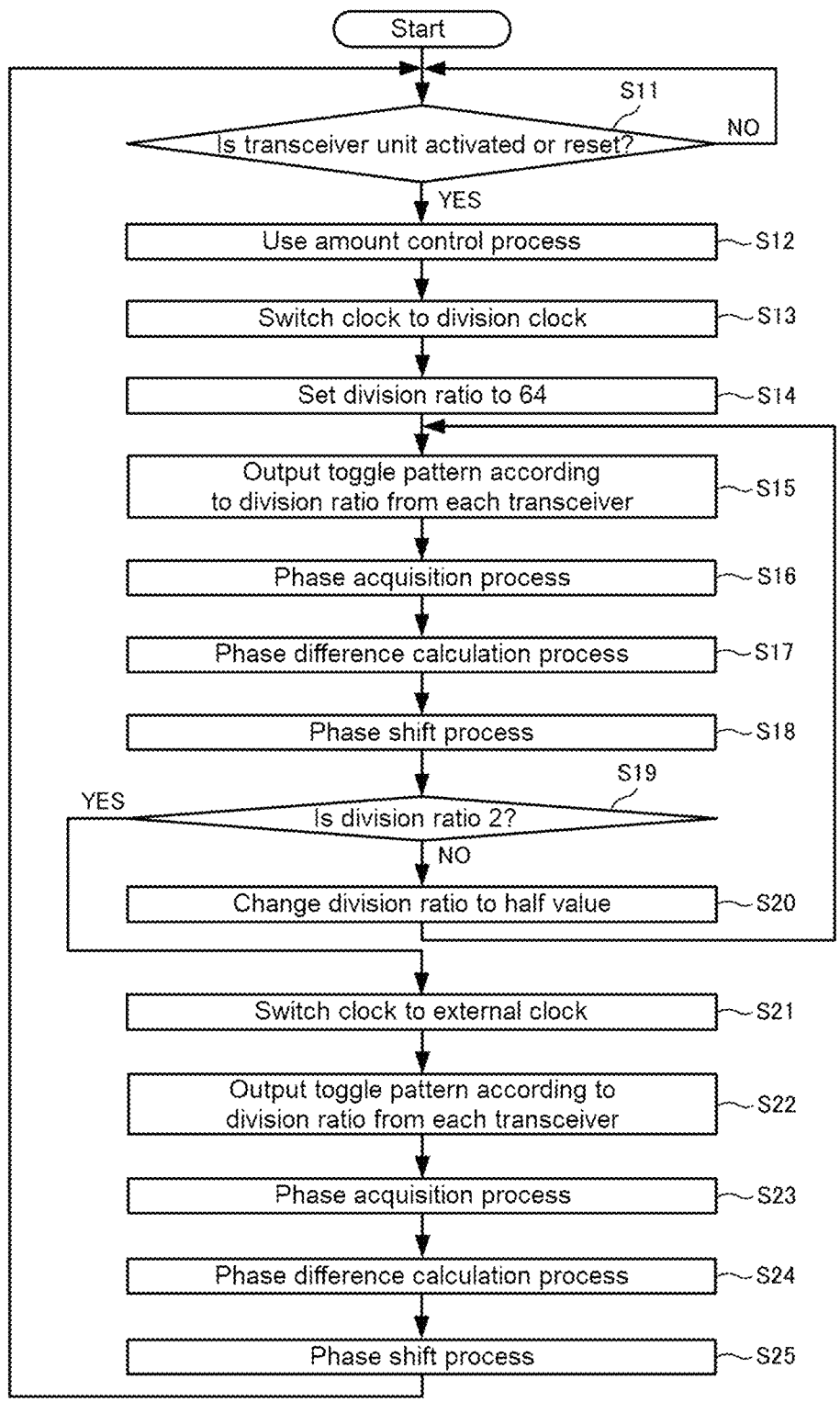
FIG. 11 is a flowchart illustrating a process of a signal generation method using the signal generation apparatus of FIG. 1.

Hereinafter, an example of a process of a signal generation method using the signal generation apparatus 1 according to the present embodiment will be described with reference to the flowchart in FIG. 11. Description overlapping with the description of the configuration of the signal generation apparatus 1 will be appropriately omitted.

In a case where each transceiver unit 12 is activated or reset (YES in step S11), the phase synchronization control unit 31 executes a use amount control process (step S12). For example, in a case where a bit rate of a PAM signal output from the signal generation apparatus 1 is changed by an operation input to the operation unit 65 by a user, each of the transceiver units 12 is reset. The use amount of the FIFO 21 of each transceiver 20 is halved by the use amount control process.

Figure 12:
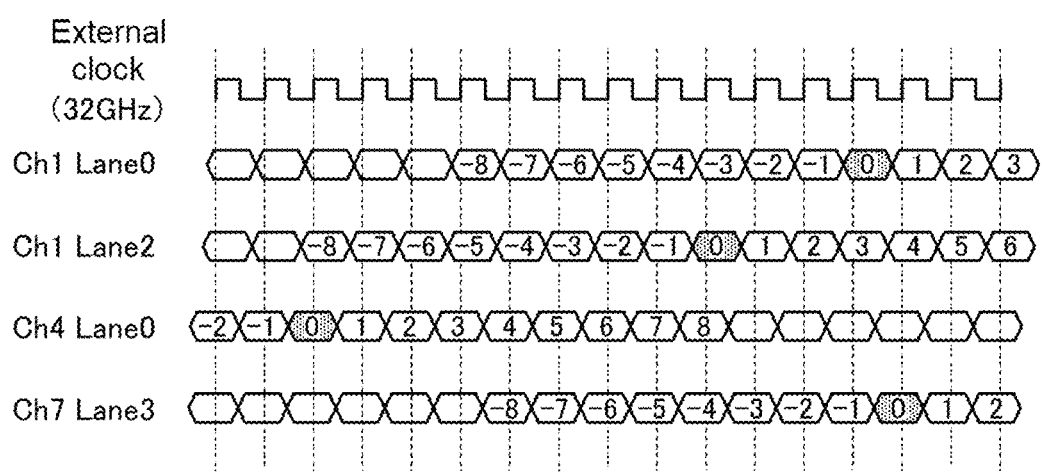
FIG. 12 is a diagram illustrating a phase relationship of the toggle pattern of each lane after a use amount control process.

FIG. 12 is a diagram illustrating an example of a phase relationship of a toggle pattern output from the transceiver 20 of each lane after the use amount control process in a simplified manner. A vertical broken line in FIG. 12 indicates a rising timing of the external clock. Each transceiver unit 12 includes four lanes from a lane 0 to a lane 3. In FIG. 12, "Ch1 Lane0", "Ch1 Lane2", "Ch4 Lane0", and "Ch7 Lane3" indicate the lane 0 of the transceiver unit 12-1, the lane 2 of the transceiver unit 12-1, the lane 0 of the transceiver unit 12-4, and the lane 3 of the transceiver unit 12-7, respectively. Data indicated by "0" in a toggle pattern of each lane is data that should be aligned in the same phase in all the lanes. The same notation is used in the following drawings. After the use amount control process, a phase of the toggle pattern of each lane usually deviates from each other by one clock of the external clock.

Next, the clock selection unit 17 selects a division clock (division clock selection step S13).

Next, the division ratio setting unit 33 sets a value of a division ratio of the division clock in the division clock output unit 14 to 64 (division ratio setting step S14). Although there is a phase difference between the division clock and the external clock at this time, it is not necessary to consider this at this time point.

Next, the rate control unit 34 causes each transceiver 20 to output a toggle pattern of a frequency half of a frequency of the division clock of the division ratio set in the division ratio setting step S14 (rate control step S15).

Next, the phase acquisition processing unit 31*b* executes the phase acquisition process of acquiring a voltage value measured by the phase demodulation unit 40 while changing the phase of the toggle pattern output from each transceiver 20 from an initial value (phase acquisition process step S16).

Next, the phase difference calculation processing unit 31*c* executes the phase difference calculation process of calculating the initial phase difference $P_C$ between the division clock selected in the division clock selection step S13 and the initial value of the phase of the toggle pattern, based on a relationship between the voltage value acquired by the phase acquisition process step S16 and the change amount from the initial value of the phase of the toggle pattern (the phase difference calculation process step S17).

Figure 13A:
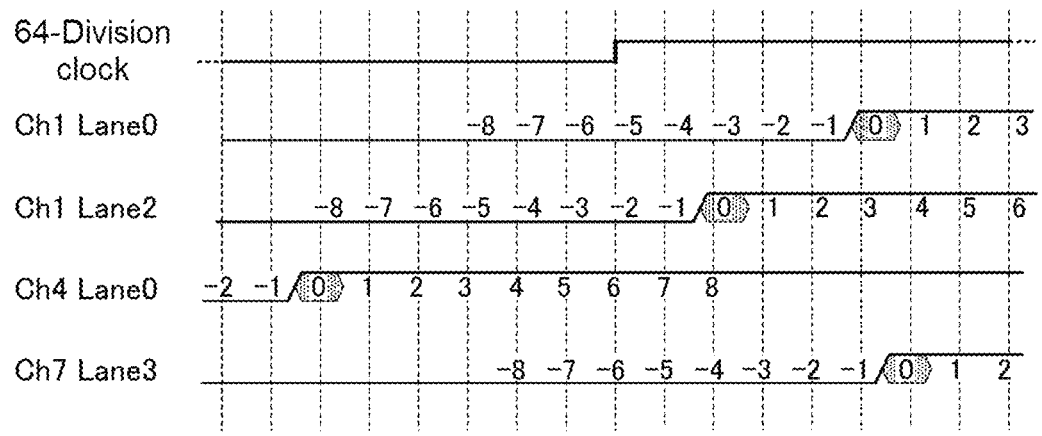

FIG. 13A is a diagram illustrating a timing of the toggle pattern of each lane immediately after the initial phase difference $P_C$ is calculated by the phase difference calculation process when the division ratio of the division clock is 64 in a simplified manner. In this case, if the maximum phase difference between the toggle patterns of each lane is 32 UI or less with respect to the external clock base, the subsequent the phase shift process can be executed without an error.

Next, the phase shift processing unit 31*d* executes the phase shift process of moving the phase of the toggle pattern from the initial value by the initial phase difference $P_C$ such that the phase difference between the division clock selected in the division clock selection step S13 and the toggle pattern is a value within a predetermined range (phase shift process step S18).

Figure 13B:
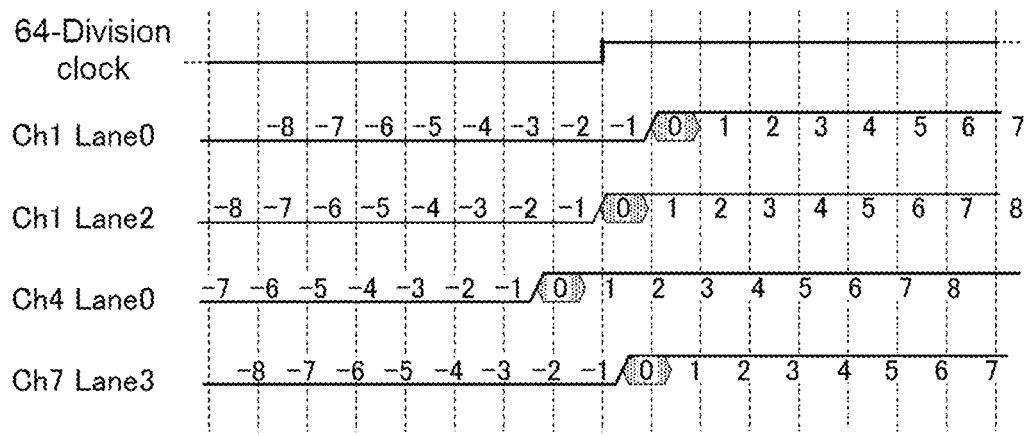

FIG. 13B is a diagram illustrating a timing of the toggle pattern of each lane immediately after the phase is moved by the phase shift process in a case where the division ratio of the division clock is 64 in a simplified manner. In this case, the maximum phase difference between the toggle patterns of all the lanes is adjusted to 0.1 UI or less with respect to the division clock base, that is, 6.4 UI (0.1 UI×division of 64) or less with respect to the external clock base.

In a case where the current division ratio is more than 2 (NO in step S19), the division ratio setting unit 33 sets the division ratio of the division clock in the division clock output unit 14 to a current half value (division ratio setting step S20). Then, the processes after step S15 are executed again.

That is, steps S15 to S20 are steps of repeatedly executing the phase acquisition process, the phase difference calculation process, and the phase shift process while gradually decreasing the division ratio in the division ratio setting step S20.

Figure 14A:
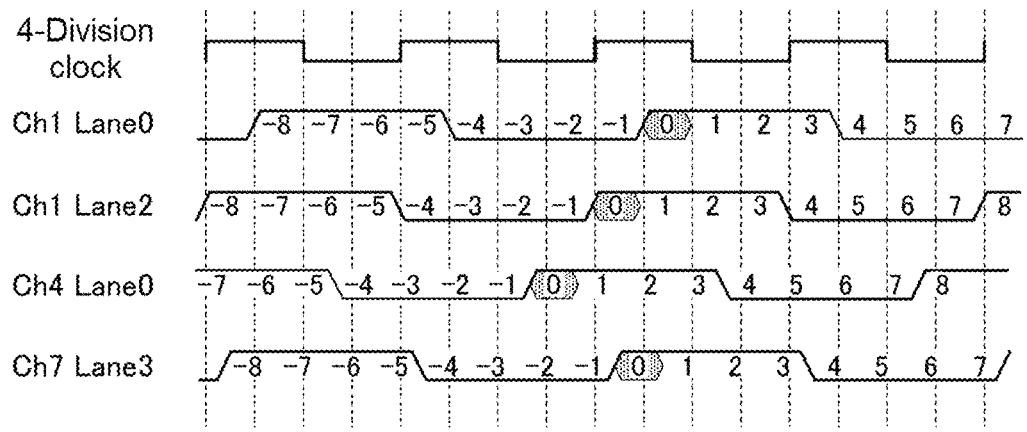

FIG. 14A is a diagram illustrating a timing of the toggle pattern of each lane immediately after the initial phase difference $P_C$ is calculated by the phase difference calculation process when the division ratio of the division clock is decreased up to 32, 16, and 8 by half by the division ratio setting unit 33 and reaches 4 in a simplified manner.

Figure 14B:
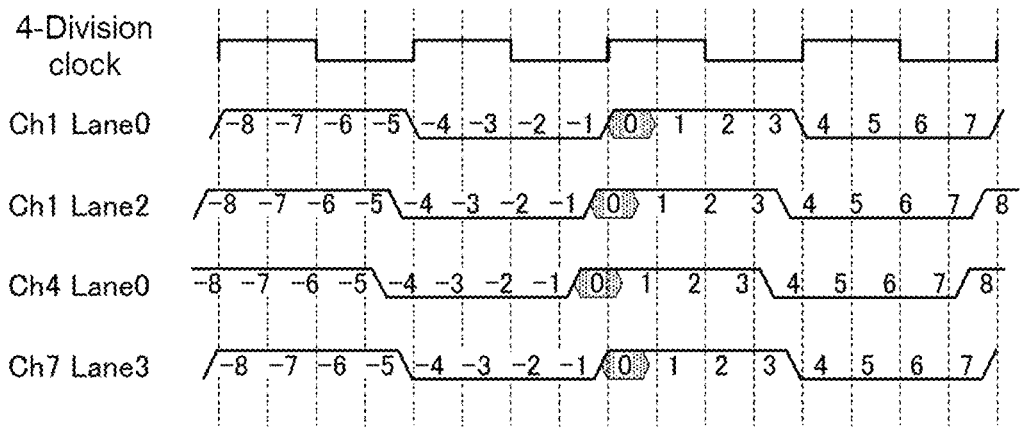

FIG. 14B is a diagram illustrating a timing of the toggle pattern of each lane immediately after the phase is moved by the phase shift process in a case where the division ratio of the division clock is 4 in a simplified manner. In this case, the maximum phase difference between the toggle patterns of all the lanes is adjusted to 0.1 UI or less with respect to the division clock base, that is, 0.4 UI (0.1 UI×division of 4) or less with respect to the external clock base.

Figure 15A:
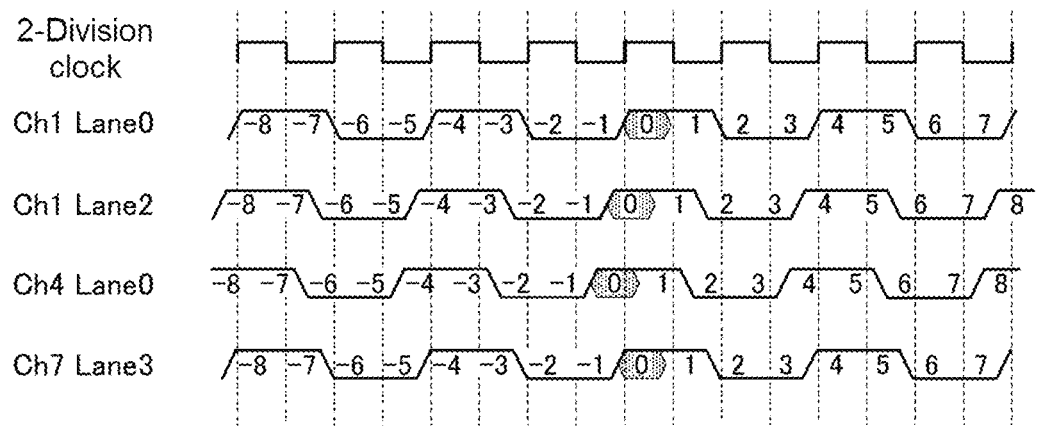

FIG. 15A is a diagram illustrating a timing of the toggle pattern of each lane immediately after the initial phase difference $P_C$ is calculated by the phase difference calculation process in a case where the division ratio of the division clock reaches 2 by the division ratio setting unit 33 in a simplified manner.

Figure 15B:
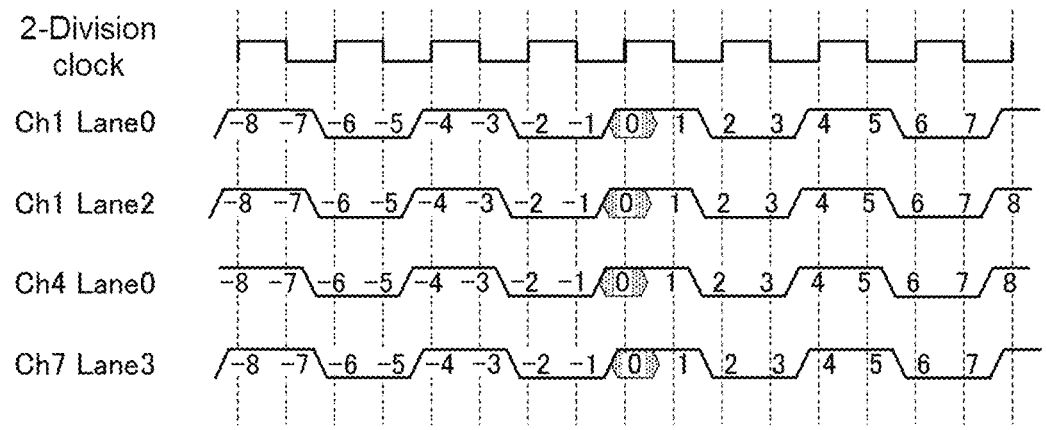

FIG. 15B is a diagram illustrating a timing of the toggle pattern of each lane immediately after the phase is moved by the phase shift process in a case where the division ratio of the division clock is 2 in a simplified manner. In this case, the maximum phase difference between the toggle patterns of all the lanes is adjusted to 0.1 UI or less with respect to the division clock base, that is, 0.2 UI (0.1 UI×division of 2) or less with respect to the external clock base.

On the other hand, in a case where the current division ratio is 2 (YES in step S19), the clock selection unit 17 selects the external clock instead of the division clock (external clock selection step S21). Although the external clock is equivalent to a division clock having a division ratio of 1, the phase of the external clock does not usually coincide with the phase of the division clock.

Next, the rate control unit 34 causes each of the transceivers 20 to output a toggle pattern having frequency half of the frequency of the external clock (rate control step S22).

Next, the phase acquisition processing unit 31*b* executes the phase acquisition process of acquiring a voltage value measured by the phase demodulation unit 40 while changing the phase of the toggle pattern output from each transceiver 20 from an initial value (phase acquisition process step S23).

Next, the phase difference calculation processing unit 31*c* executes the phase difference calculation process of calculating the initial phase difference $P_C$ between the external clock selected in the external clock selection step S21 and the initial value of the phase of the toggle pattern, based on a relationship between the voltage value acquired by the phase acquisition process step S23 and the change amount from the initial value of the phase of the toggle pattern (the phase difference calculation process step S24).

Figure 16A:
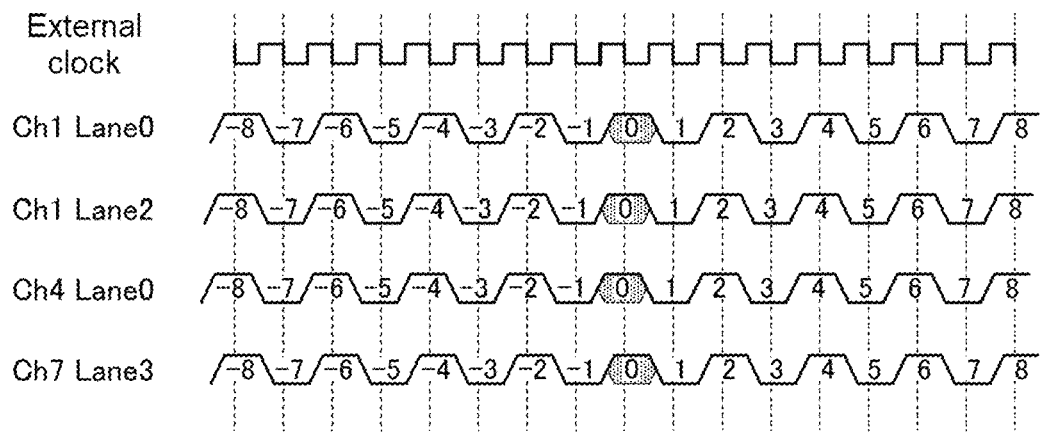

FIG. 16A is a diagram illustrating a timing of the toggle pattern of each lane immediately after the initial phase difference $P_C$ is calculated by the phase difference calculation process in a case where the external clock is selected by the clock selection unit 17 in a simplified manner.

Next, the phase shift processing unit 31*d* executes the phase shift process of moving the phase of the toggle pattern from the initial value by the initial phase difference $P_C$ such that the phase difference between the external clock selected in the external clock selection step S21 and the toggle pattern is a value within a predetermined range (phase shift process step S25).

Figure 16B:
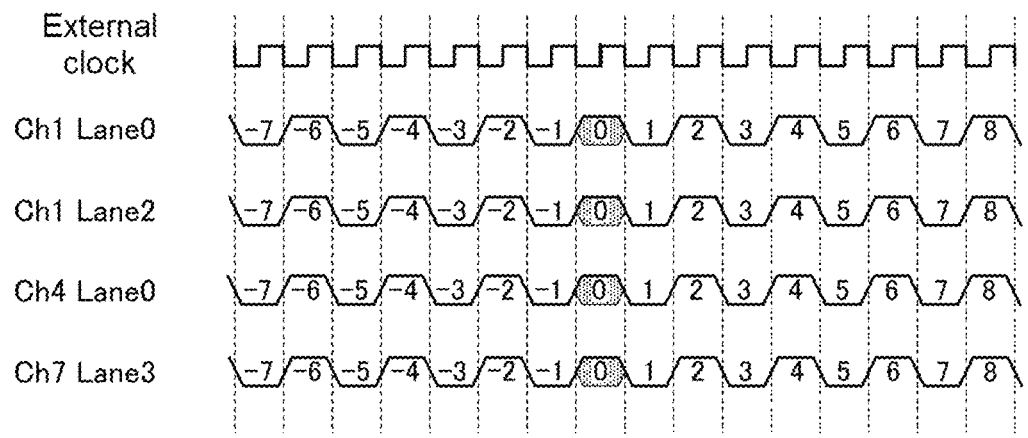

FIG. 16B is a diagram illustrating a timing of the toggle pattern of each lane immediately after the phase is moved by the phase shift process in a case where the external clock is selected by the clock selection unit 17 in a simplified manner. In this case, the maximum phase difference between the toggle patterns of all the lanes is adjusted to 0.1 UI (0.1 UI×division of 1) or less with respect to the external clock base.

Then, the phase synchronization control unit 31 is in a wait state until each of the transceiver units 12 is activated or reset again (step S11).

In step S11, it is assumed that the process after step S12 is automatically executed by activating or resetting each transceiver unit 12, and the present invention is not limited to this. For example, in step S11, a user may press an execution button provided on an operation screen (not illustrated) of the signal generation apparatus 1 via the operation unit 65, so that the user can execute the process after step S12 at any timing.

If the phase adjustment of the toggle pattern output from each transceiver 20 is completed in step S25, the FPGA control unit 15 automatically shifts to a mode of generating a PAM signal during a normal operation, and causes the parallel data output unit 11 to output parallel data of N bits for the normal operation according to the frequency of the external clock.

In this manner, in the signal generation method using the signal generation apparatus 1 according to the present embodiment, the phase of the toggle pattern of each lane is roughly adjusted with a large movement amount by using the division clock having the large division ratio at the beginning, and the phase of the toggle pattern of each lane can be finely adjusted with a small movement amount by using the external clock corresponding to the division ratio equivalent to 1 at the end.

As described above, in the signal generation apparatus 1 according to the present embodiment, the phase acquisition process, the phase difference calculation process, and the phase shift process are repeatedly executed while causing the division ratio setting unit 33 to gradually decrease the division ratio of the division clock.

With this configuration, the signal generation apparatus 1 according to the present embodiment can reduce the maximum phase difference between the pieces of serial data respectively output from the plurality of transceivers 20 to 0.1 UI or less with the external clock base.

In addition, the signal generation apparatus according to the present embodiment can significantly increase the adjustable maximum phase difference between the pieces of serial data respectively output from the plurality of transceivers 20 after the activation or the reset.

For example, in the signal generation apparatus 1 according to the present embodiment, the adjustable maximum phase difference between the pieces of serial data from the respective transceivers 20 can be set to 32 UIs with the external clock base. This value is equivalent to, for example, 1000 ps in a case of 32 Gbps. For example, since a phase error on a data sheet of a GTY transceiver of UltraScale+ manufactured by Xilinx, Inc. is 500 ps, the signal generation apparatus 1 according to the present embodiment can converge the phase error.

Further, the signal generation apparatus 1 according to the present embodiment does not require an additional mechanism such as a delay circuit outside the FPGA for reducing the phase difference between the serial data before the adjustment to within 1 UI in advance, and thus it is not necessary to investigate a parameter to be given to the additional mechanism after a product is manufactured.

Although the signal generation apparatus 1 according to the present embodiment requires the ADC 55 for each lane, required speed performance of the ADC 55 is low (several hundred ksps to several Msps), and thus it is also possible to use an ADC having a plurality of input channels, and it is expected that an ADC peripheral circuit can be miniaturized. Further, in the signal generation apparatus 1 according to the present embodiment, since an external delay circuit is unnecessary, it is also possible to reduce a circuit scale and a substrate size.

In addition, the signal generation apparatus 1 according to the present embodiment executes the use amount control process of equalizing the use amounts of all the lanes of the FIFO 21 to half before starting the phase acquisition process, the phase difference calculation process, and the phase shift process. As a result, in the signal generation apparatus 1 according to the present embodiment, for example, in a case where the use amount of the FIFO 21 is the largest and the division clock of the division ratio is equivalent to 2 UI, the phase of the toggle pattern can be moved to both the positive and negative maximum ranges of −1 UI to +1 UI during the phase acquisition process.

DESCRIPTION OF REFERENCE NUMERALS AND SIGNS

1 Signal generation apparatus
10 Data output unit
11 Parallel data output unit
12, 12-1 to 12-8 Transceiver unit
13 Clock generation unit
14 Division clock output unit
15 FPGA control unit
17 Clock selection unit
20, 20-0 to 20-3 Transceiver
21 FIFO
22 PISO
23 Use amount determination unit
24 Phase adjustment unit
25, 26 Divider
27 Subtractor
31 Phase synchronization control unit
31a Use amount control processing unit
31b Phase acquisition processing unit
31c Phase difference calculation processing unit
31d Phase shift processing unit
33 Division ratio setting unit
34 Rate control unit
40 Phase demodulation unit
41 D flip-flop
42 EXOR circuit
43 Averaging circuit
50 MUX
52 Amplifier
55 ADC
60 DAC
65 Operation unit
70 Control unit

What is claimed is:
1. A signal generation apparatus comprising:
a parallel data output unit that outputs parallel data of a plurality of bits;
a plurality of transceivers that have a first-in first-out (FIFO) for storing parallel data of N bits among the parallel data of the plurality of bits output from the parallel data output unit, and convert the parallel data of N bits stored in the FIFO into serial data of 1 bit;
a phase synchronization control unit that controls a phase of the serial data of 1 bit converted by each of the transceivers;
a division clock output unit that outputs a division clock obtained by dividing a frequency of an external clock;
a division ratio setting unit that sets a division ratio of the division clock in the division clock output unit;
a clock selection unit that selects any one of the external clock and the division clock;
a rate control unit that performs control of outputting a toggle pattern having a frequency half a frequency of the division clock or the external clock selected by the clock selection unit as the serial data of 1 bit from each of the transceivers; and a phase demodulation unit that measures a voltage value corresponding difference between the division clock or the external clock selected by the clock selection unit and the toggle pattern, wherein the phase synchronization control unit includes a phase acquisition processing unit that executes a phase acquisition process of acquiring the voltage value measured by the phase demodulation unit while changing a phase of the toggle pattern from an initial value, a phase difference calculation processing unit that executes a phase difference calculation process of calculating an initial phase difference between the division clock or the external clock selected by the clock selection unit and the initial value of the phase of the toggle pattern, based on a relationship between the voltage value acquired by the phase acquisition processing unit and a change amount from the initial value of the phase of the toggle pattern, and a phase shift processing unit that executes a phase shift process of moving the phase of the toggle pattern from the initial value by the initial phase difference such that a phase difference between the division clock or the external clock selected by the clock selection unit and the toggle pattern is within a predetermined range, the phase synchronization control unit repeatedly executes the phase acquisition process, the phase difference calculation process, and the phase shift process while causing the division ratio setting unit to gradually decrease the division ratio, and the clock selection unit selects the external clock instead of the division clock after the phase acquisition process, the phase difference calculation process, and the phase shift process are executed when the division ratio is a predetermined minimum value.

2. The signal generation apparatus according to claim 1, wherein the division ratio is an integer of a power of 2, and the clock selection unit selects the external clock instead of the division clock after the phase acquisition process, the phase difference calculation process, and the phase shift process are executed when the division ratio is 2.

3. The signal generation apparatus according to claim 1, wherein each of the transceivers includes a parallel-in serial-out (PISO) that converts the parallel data of N bits read from the FIFO into the serial data of 1 bit in accordance with a read clock signal, a use amount determination unit that executes first and second use amount determination processes of determining whether or not a use amount of the FIFO is equal to or more than a use amount threshold value, and a phase adjustment unit that executes a first phase adjustment process of decreasing a phase of the read clock signal by a predetermined amount and a second phase adjustment process of increasing the phase of the read clock signal by the predetermined amount, the phase synchronization control unit further includes a use amount control processing unit that executes a use amount control process of controlling the use amount of the FIFO, the use amount control processing unit causes the use amount determination unit to execute the first use amount determination process under a condition in which an output of the serial data from each of the transceivers is started, the use amount control processing unit causes the phase adjustment unit to execute the first phase adjustment process under a condition in which the use amount of the FIFO of each of the transceivers is determined to be equal to or more than the use amount threshold value in the first use amount determination process, the use amount control processing unit causes the use amount determination unit to execute the second use amount determination process under a condition in which the number of times the use amount of the FIFO of each of the transceivers is continuously determined to be less than the use amount threshold value in the first use amount determination process reaches a first determination count, the use amount control processing unit causes the phase adjustment unit to execute the second phase adjustment process under a condition in which the use amount of the FIFO of each of the transceivers is determined to be less than the use amount threshold value in the second use amount determination process, and the use amount control processing unit causes the phase adjustment unit to end the adjustment of the phase of the read clock signal under a condition in which the number of times the use amount of the FIFO of each of the transceivers is continuously determined to be equal to or more than the use amount threshold value in the second use amount determination process reaches a second determination count.

4. A signal generation method using a signal generation apparatus including a parallel data output unit that outputs parallel data of a plurality of bits, a plurality of transceivers that have a first-in first-out (FIFO) for storing parallel data of N bits among the parallel data of the plurality of bits output from the parallel data output unit, and convert the parallel data of N bits stored in the FIFO into serial data of 1 bit, a division clock output unit that outputs a division clock obtained by dividing a frequency of an external clock, a clock selection unit that selects any one of the external clock and the division clock, and a phase demodulation unit that measures a voltage value corresponding to a phase difference between the division clock or the external clock selected by the clock selection unit and the serial data of 1 bit, to control a phase of the serial data of 1 bit converted by each of the transceivers, the signal generation method comprising:

a division ratio setting step of setting a division ratio of the division clock in the division clock output unit;

a rate control step of outputting a toggle pattern having a frequency half a frequency of the division clock or the external clock selected by the clock selection unit as the serial data of 1 bit from each of the transceivers;

a phase acquisition process step of executing a phase acquisition process of acquiring the voltage value measured by the phase demodulation unit while changing a phase of the toggle pattern from an initial value;

a phase difference calculation process step of executing a phase difference calculation process of calculating an initial phase difference between the division clock or the external clock selected by the clock selection unit and the initial value of the phase of the toggle pattern based on a relationship between the voltage value acquired by the phase acquisition process step and a change amount from the initial value of the phase of the toggle pattern;

a phase shift process step of executing a phase shift process of moving the phase of the toggle pattern from the initial value by the initial phase difference such that a phase difference between the division clock or the external clock selected by the clock selection unit and the toggle pattern is within a predetermined range;

a step of repeatedly executing the phase acquisition process, the phase difference calculation process, and the phase shift process while gradually decreasing the division ratio in the division ratio setting step; and an external clock selection step of causing the clock selection unit to select the external clock instead of the division clock after the phase acquisition process, the phase difference calculation process, and the phase shift process are executed when the division ratio is a predetermined minimum value.

5. The signal generation method according to claim 4, wherein the division ratio is an integer of a power of 2, and in the external clock selection step, after the phase acquisition process, the phase difference calculation process, and the phase shift process are executed when the division ratio is 2, the external clock is selected instead of the division clock.

6. The signal generation method according to claim 4, wherein each of the transceivers includes a parallel-in serial-out (PISO) that converts the parallel data of N bits read from the FIFO into the serial data of 1 bit in accordance with a read clock signal, a use amount determination unit that executes first and second use amount determination processes of determining whether or not a use amount of the FIFO is equal to or more than a use amount threshold value, and a phase adjustment unit that executes a first phase adjustment process of decreasing a phase of the read clock signal by a predetermined amount and a second phase adjustment process of increasing the phase of the read clock signal by the predetermined amount, a phase synchronization control unit includes a use amount control processing unit that executes a use amount control process of controlling the use amount of the FIFO, the use amount control processing unit causes the use amount determination unit to execute the first use amount determination process under a condition in which an output of the serial data from each of the transceivers is started, the use amount control processing unit causes the phase adjustment unit to execute the first phase adjustment process under a condition in which the use amount of the FIFO of each of the transceivers is determined to be equal to or more than the use amount threshold value in the first use amount determination process, the use amount control processing unit causes the use amount determination unit to execute the second use amount determination process under a condition in which the number of times the use amount of the FIFO of each of the transceivers is continuously determined to be less than the use amount threshold value in the first use amount determination process reaches a first determination count, the use amount control processing unit causes the phase adjustment unit to execute the second phase adjustment process under a condition in which the use amount of the FIFO of each of the transceivers is determined to be less than the use amount threshold value in the second use amount determination process, and the use amount control processing unit causes the phase adjustment unit to end the adjustment of the phase of the read clock signal under a condition in which the number of times the use amount of the FIFO of each of the transceivers is continuously determined to be equal to or more than the use amount threshold value in the second use amount determination process reaches a second determination count.

* * * * *